US009030136B2

(12) United States Patent  
Sugita et al.

(10) Patent No.: US 9,030,136 B2  
(45) Date of Patent: May 12, 2015

(54) MOTOR CONTROLLING APPARATUS

(75) Inventors: Hidehiko Sugita, Sagamihara (JP); Ken Ito, Machida (JP)

(73) Assignee: Nissan Motor Co., Ltd., Yokohama (JP)

( * ) Notice: Subject to any disclaimer, the term of this patent is extended or adjusted under 35 U.S.C. 154(b) by 208 days.

(21) Appl. No.: 13/816,871

(22) PCT Filed: Sep. 7, 2011

(86) PCT No.: PCT/IB2011/002088  
§ 371 (c)(1),  
(2), (4) Date: Feb. 13, 2013

(87) PCT Pub. No.: WO2012/042321  
PCT Pub. Date: Apr. 5, 2012

(65) Prior Publication Data  
US 2013/0141023 A1 Jun. 6, 2013

(30) Foreign Application Priority Data  
Sep. 28, 2010 (JP) .................................. 2010-217373

(51) Int. Cl.  
*H02P 21/00* (2006.01)  
*H02P 6/14* (2006.01)  
(Continued)

(52) U.S. Cl.  
CPC ............ *H02P 6/145* (2013.01); *H02P 21/0003* (2013.01); *H02P 21/06* (2013.01); *H02P 21/146* (2013.01)

(58) Field of Classification Search  
USPC ............... 318/722, 400.02, 807, 400.01, 805, 318/400.22  
See application file for complete search history.

(56) References Cited

U.S. PATENT DOCUMENTS 6,329,781 B1 * 12/2001 Matsui et al. ................. 318/717  
6,407,531 B1 6/2002 Walters et al.  
(Continued)

FOREIGN PATENT DOCUMENTS

CN 1399402 A 2/2003  
CN 101031864 A 9/2007  
(Continued)

OTHER PUBLICATIONS

An English translation of the Korean Office Action for the corresponding Korean patent application No. 10-2013-7005281 issued on Mar. 28, 2014.  
(Continued)

*Primary Examiner* — Kawing Chan  
*Assistant Examiner* — Jorge L Carrasquillo  
(74) *Attorney, Agent, or Firm* — Global IP Counselors, LLP

(57) ABSTRACT

A motor controlling apparatus including an inverter, a voltage detector, a rotational speed detector, a command value calculating component, an inverter controller, a state detector and an offsetting component. The inverter converts direct-current power to alternating-current power supplied to a motor. The voltage detector detects a direct-current voltage, and the rotational speed detector detects a rotational speed of the motor. The calculating component calculates current and torque command values, and motor rotational speed. The controller provides a control signal to control the inverter based on the current command value. The state detector detects a control state of the inverter, and the offsetting component offsets the detected voltage or rotational speed by an offset amount. The calculating component modifies the current command value based on the offset detected voltage or rotational speed to increase on a negative side a d-axis current command value included in the current command value.

20 Claims, 11 Drawing Sheets

(51) Int. Cl.
*H02P 21/06* (2006.01)
*H02P 21/14* (2006.01)

(56) References Cited

U.S. PATENT DOCUMENTS

| | | | |
|---|---|---|---|
| 6,737,828 | B2 | 5/2004 | Kiuchi et al. |
| 7,427,849 | B2 | 9/2008 | Kaneko et al. |
| 7,759,886 | B2 * | 7/2010 | Gallegos-Lopez et al. ............ 318/400.2 |
| 2009/0027000 | A1 * | 1/2009 | Gallegos-Lopez et al. ... 318/722 |
| 2011/0061547 | A1 * | 3/2011 | Nagase et al. ................ 100/35 |
| 2011/0062908 | A1 * | 3/2011 | Kitanaka ................ 318/400.22 |

FOREIGN PATENT DOCUMENTS

| | | |
|---|---|---|
| CN | 101399516 A | 4/2009 |
| EP | 0638457 A2 | 2/1995 |
| JP | 2003-309997 A | 10/2003 |
| JP | 2010130726 A | 6/2010 |

OTHER PUBLICATIONS

An English translation of the Chinese Office Action for the corresponding Chinese patent application No. 201180044715.1 issued on Nov. 3, 2014.

* cited by examiner

US 9,030,136 B2

MOTOR CONTROLLING APPARATUS

CROSS-REFERENCE TO RELATED APPLICATIONS

This application is a U.S. National stage of International Application No. PCT/IB2011/002088, filed Sep. 7, 2011. This application claims priority to Japanese Patent Application No. 2010-217373, filed on Sep. 28, 2010. The entire disclosure of Japanese Patent Application No. 2010-217373 is hereby incorporated herein by reference.

BACKGROUND

1. Field of the Invention

The present invention generally relates to a motor controlling apparatus. More particularly, the present invention relates to an apparatus and method for controlling a motor by stabilizing and controlling an inverter that provides power to a motor to mitigate a decline in the efficiency of the inverter.

2. Background Information

In a typical device for controlling an alternating-current motor, a voltage being applied to the motor is controlled using an inverter. Also, the control device selects between a first control line and a second control line according to the active area of the alternating-current motor. Accordingly, the controller generates a current command that corresponds to the torque command value associated with the selected control line. That is, as described in Japanese Laid-Open Patent Application No. 2010-130726, the first control line sets a torque current command corresponding to the torque command value according to the phase of the current in which the torque of the alternating-current motor reaches a maximum with respect to the amplitude of the current. On the other hand, the second control line sets a torque current command corresponding to the torque command value according to the phase of the current in which the amplitude of the current corresponding to the torque is higher than in the first control line.

SUMMARY

However, it has been discovered that in the second control line, the amplitude of the current is set high in order to maintain an adequate margin with respect to voltage insufficiency and other factors. As a result, the efficiency of the inverter greatly declines upon switching to the second control line.

Accordingly, an object of the motor controlling apparatus according to a disclosed embodiment is to stabilize and control an inverter while mitigating a decline in the efficiency of the inverter.

In view of the state of the known technology, one aspect of the present disclosure is to provide a motor controlling apparatus comprising an inverter, a voltage detector, a rotational speed detector, a command value calculating component, an inverter controller, a state detector and an offsetting component. The inverter is configured to convert direct-current power to alternating-current power and supply the power to a motor, the direct-current power being input from a direct-current power source. The voltage detector is configured to detect a direct-current voltage of the direct-current power source. The rotational speed detector is configured to detect a rotational speed of the motor. The command value calculating component is configured to calculate a current command value for an alternating current output by the inverter based on a detected voltage detected by the voltage detector, a torque command value input from an external source, and a detected rotational speed detected by the rotational speed detector. The inverter controller is configured to provide a control signal for a switching element included in the inverter and to control the inverter based on the current command value. The state detector is configured to detect a control state of the inverter. The offsetting component is configured to offset the detected voltage or the detected rotational speed by an offset amount according to the control state detected by the state detector. Thus, the command value calculating component is further configured to modify the current command value based on the detected voltage or detected rotational speed offset by the offsetting component, and to increase on a negative side a d-axis current command value included in the current command value.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
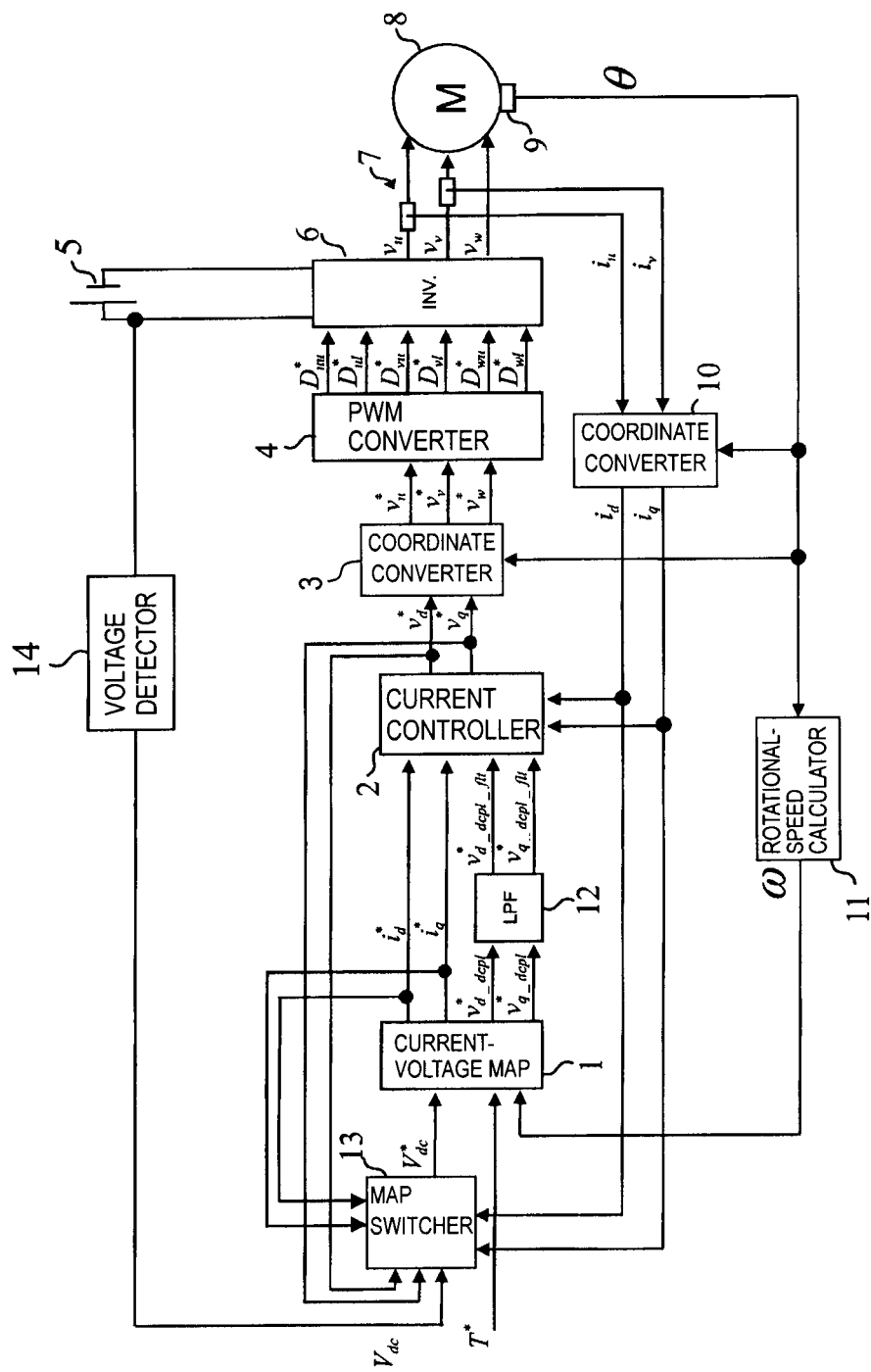
FIG. 1 is block diagram of a motor controlling apparatus according to a disclosed embodiment.

FIG. 1 is an exemplary block diagram of a motor controlling apparatus according to a first disclosed embodiment. When the inverter-controlling apparatus of the illustrated embodiment is provided in an electric vehicle, such as a car, truck, van, SUV and so on, a permanent-magnet motor 8 powered by three-phase alternating current operates as a motive drive source that is coupled to an axle of the electric vehicle. The motor controlling apparatus of the illustrated embodiment can also be applied to, for example, hybrid automobiles (HEVs) or other types of vehicles.

The inverter-controlling apparatus of the illustrated embodiment can be configured as a control apparatus for controlling the operation of the motor 8. The apparatus includes a current-voltage map 1, a current controller 2, a coordinate converter 3, a pulse-width modulation (PWM) converter 4, a battery 5 and an inverter 6. The apparatus further includes current sensors 7, a magnetic-pole-position detector 9, a coordinate converter 10, a rotational-speed calculator 11, a LPF (low pass filter) 12, a map switcher 13 and a voltage detector 14.

A torque command value (T*) that is input from an external source as a target output value for the motor 8; an angular frequency ($\omega$) of the motor 8 output from the rotational-speed calculator 11; and a voltage ($V^*_{dc}$) output from the map switcher 13 are input to the current-voltage map 1. Maps for outputting dq-axis current command values ($i^*_d$, $i^*_q$) and dq-axis decoupled voltage command values ($V^*_{d\_dcpl}$, $V^*_{q\_dcpl}$) that use the torque command value (T*), the angular frequency ($\omega$) and the voltage ($V^*_{dc}$) as indices are stored in the current-voltage map 1. An example of the detailed configuration of the maps will be described below. The current-voltage map 1 makes reference to the maps, whereby the dq-axis current command values ($i^*_d$, $i^*_q$) and the dq-axis decoupled voltage command values ($V^*_{d\_dcpl}$, $V^*_{q\_dcpl}$) corresponding to the torque command value (T*), the angular frequency ($\omega$) and the voltage ($V^*_{dc}$) are calculated and output. The "dq-axis" refers to components in the rotational coordinate system. Decoupled voltage command values ($V^*_{d\_dcpl}$, $V^*_{q\_dcpl}$), decoupled voltages of $\omega L_d i_d$ on the d-axis and $\omega L_q i_q$ on the q-axis are produced when current flows along the d-axis and the q-axis. Thus, the dq-axis decoupled voltage command values ($V^*_{d\_dcpl}$, $V^*_{q\_dcpl}$) act as voltages for canceling out these decoupled voltages. In this example, $L_d$ represents the inductance of the d-axis, and $L_q$ represents the inductance of the q-axis. The dq-axis current command values ($i^*_d$, $i^*_q$) and the dq-axis decoupled voltage command values ($V^*_{d\_dcpl}$, $V^*_{q\_dcpl}$) correspond to alternating-current command values output from the inverter 6 to the motor 8. As described below, the pulse width of switching elements and the output power of the inverter 6 are decided on the basis of these command values.

The LPF 12 uses the dq-axis decoupled voltage command values ($V^*_{d\_dcpl}$, $V^*_{q\_dcpl}$) as input, cuts out high-frequency bands, and outputs voltage command values ($V^*_{d\_dcpl\_flt}$, $V^*_{q\_dcpl\_flt}$). The current controller 2 uses the dq-axis current command values ($i^*_d$, $i^*_q$), the voltage command values ($V^*_{d\_dcpl\_flt}$, $V^*_{q\_dcpl\_flt}$), and dq-axis currents ($i_d$, $i_q$) as input, performs control computations, and outputs dq-axis voltage command values ($V^*_d$, $V^*_q$) to the coordinate converter 3 and the map switcher 13.

It should be understood that the current controller 2 and any other component discussed herein having processing or control capabilities can also each include or share other conventional components such as an input interface circuit, an output interface circuit, and storage devices such as a ROM (Read Only Memory) device and a RAM (Random Access Memory) device. The RAM and ROM store processing results and control programs that are run by the current controller 2 and any other such component. Furthermore, the current controller 2 and any other such component discussed herein are operatively coupled to the components of the vehicle in a conventional manner. It will be apparent to those skilled in the art from this disclosure that the precise structure and algorithms for the current controller 2 and any other processor or controller discussed herein can be any combination of hardware and software that will carry out the functions of the embodiments discussed herein.

The coordinate converter 3 uses the dq-axis voltage command values ($V^*_d$, $V^*_q$) and a detected value $\theta$ of the magnetic-pole-position detector 9 as input and uses Equation 1 below to convert the dq-axis voltage command values ($V^*_d$, $V^*_q$) of the rotational coordinate system to voltage command values ($V^*_u$, $V^*_v$, $V^*_w$) of axes u, v and w of the fixed coordinate system.

$$\begin{bmatrix} v^*_u \\ v^*_v \\ v^*_w \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \cos\theta & -\sin\theta \\ \sin\theta & \cos\theta \end{bmatrix} \begin{bmatrix} v^*_d \\ v^*_q \end{bmatrix} \quad (1)$$

The PWM converter 4 generates driving signals ($D^*_{uu}$, $D^*_{ul}$, $D^*_{vu}$, $D^*_{vl}$, $D^*_{wu}$, $D^*_{wl}$) for the switching elements of the inverter 6 on the basis of the input voltage command values ($V^*_u$, $V^*_v$, $V^*_w$) and outputs to the inverter 6. The switching elements switch between on and off on the basis of the PWM pulse signals.

The battery 5 in this example is a direct-current power source that includes a secondary cell. The battery serves as the source of motive force for the vehicle of the illustrated embodiment. The inverter 6 comprises a three-phase inverter circuit connected to a plurality of circuits that are connected to MOSFET, IGBT or other switching elements (not shown) arranged in pairs. The driving signals ($D^*_{uu}$, $D^*_{ul}$, $D^*_{vu}$, $D^*_{vl}$, $D^*_{wu}$, $D^*_{wl}$) are input to the switching elements. The switching operations of the switching elements cause the direct-current voltage of the direct-current power source to be converted into an alternating-current voltage ($V_u$, $V_v$, $V_W$) and input to the motor 8. When the motor 8 operates as an electrical generator, the alternating-current voltage output from the motor 8 is converted to direct current and output to the battery 5 by the inverter 6. The direct current thus charges the battery 5.

The current sensors 7 are provided for a U phase and a V phase. The sensors detect phase currents ($i_u$, $i_v$) and output to the coordinate converter 10. In this example, w-phase current is not detected by the current sensors 7. Instead, the coordinate converter 10 calculates the w-phase phase current using Equation 2 below on the basis of the input phase currents ($i_u$, $i_v$) after correction.

$$i_w = -i_u - i_v \quad (2)$$

Also, a current sensor 7 may be provided for the w-phase and used for detecting the phase current of the w-phase. In addition, the motor 8 is a polyphase motor and is connected to the inverter 6. The motor 8 also operates as an electrical generator. The magnetic-pole-position detector 9 is provided to the motor 8 and is a detector for detecting the position of a magnetic pole of the motor 8 and outputting a detected value ($\theta$) to the rotational-speed calculator 11. The rotational-speed calculator 11 computes the angular frequency ($\omega$) of the motor 8 from the detected value ($\theta$) of the magnetic-pole-position detector 9.

The coordinate converter 10 is a control part for converting from three phases to two phases. The coordinate converter uses the phase currents ($i_u$, $i_v$, $i_w$) and the detected value $\theta$ of the magnetic-pole-position detector 9 as input and converts the phase currents ($i_u$, $i_v$, $i_w$) in the fixed coordinate system to phase currents ($i_d$, $i_q$) in the rotational coordinate system using Equation 3 below.

$$\begin{bmatrix} i_d \\ i_q \end{bmatrix} = \begin{bmatrix} \cos\theta & \sin\theta \\ -\sin\theta & \cos\theta \end{bmatrix} \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} i_u \\ i_v \\ i_w \end{bmatrix} \quad (3)$$

The phase currents ($i_d$, $i_q$) are input to the current controller 2 and the map switcher 13, whereby the inverter-controlling apparatus of the illustrated embodiment exerts control using a current-control loop having a predetermined gain. That is, the map switcher 13 determines the control state of the inverter 6, offsets a detected voltage ($V_{dc}$), which is output from the voltage detector 14, according to the control state determination, and outputs a reference voltage ($V^*_{dc}$) to the current-voltage map 1. When the control state of the inverter 6 is unstable, the map switcher 13 offsets the detected voltage ($V_{dc}$) and considers the offset voltage as the reference voltage ($V^*_{dc}$). On the other hand, when the control state of the inverter 6 is stable, the map switcher 13 does not offset the detected voltage ($V_{dc}$), and the detected voltage ($V_{dc}$) is output as the reference voltage ($V^*_{dc}$). The detailed configuration of the map switcher 13 is described hereinafter.

The voltage detector 14 is a sensor for detecting the direct-current voltage supplied from the battery 5 to the inverter 6. The voltage detector outputs the detected voltage ($V_{dc}$) that is detected to the map switcher 13.

Figure 2:
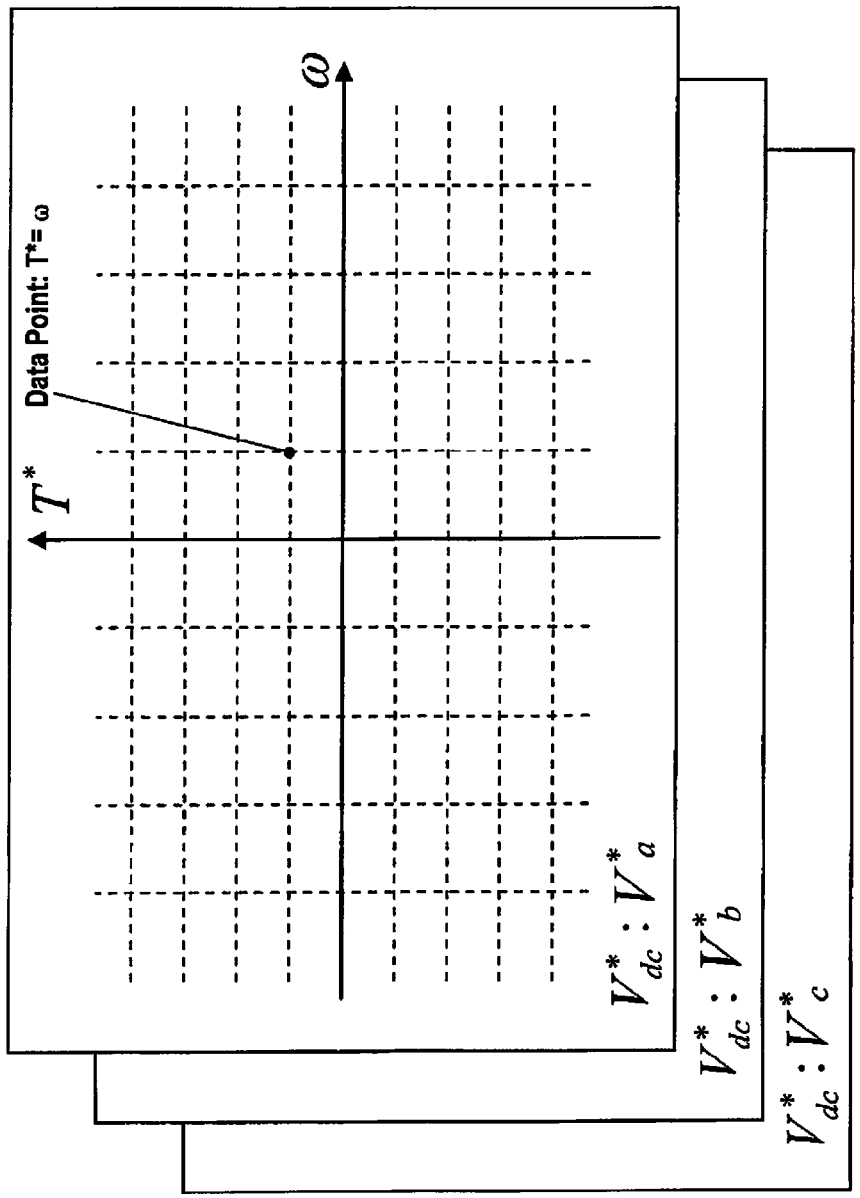
FIG. 2 is a diagram illustrating an example of maps stored as current-voltage maps in the motor controlling apparatus shown in FIG. 1.
Figure 3:
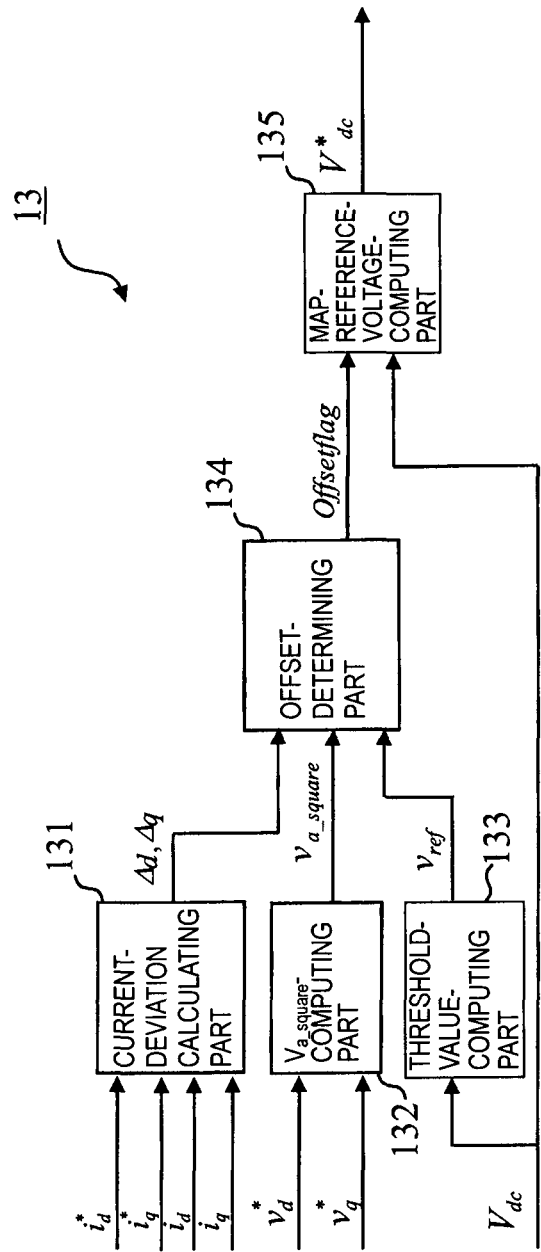
FIG. 3 is a block diagram illustrating an example of the map switcher of the motor controlling apparatus.
Figure 4:
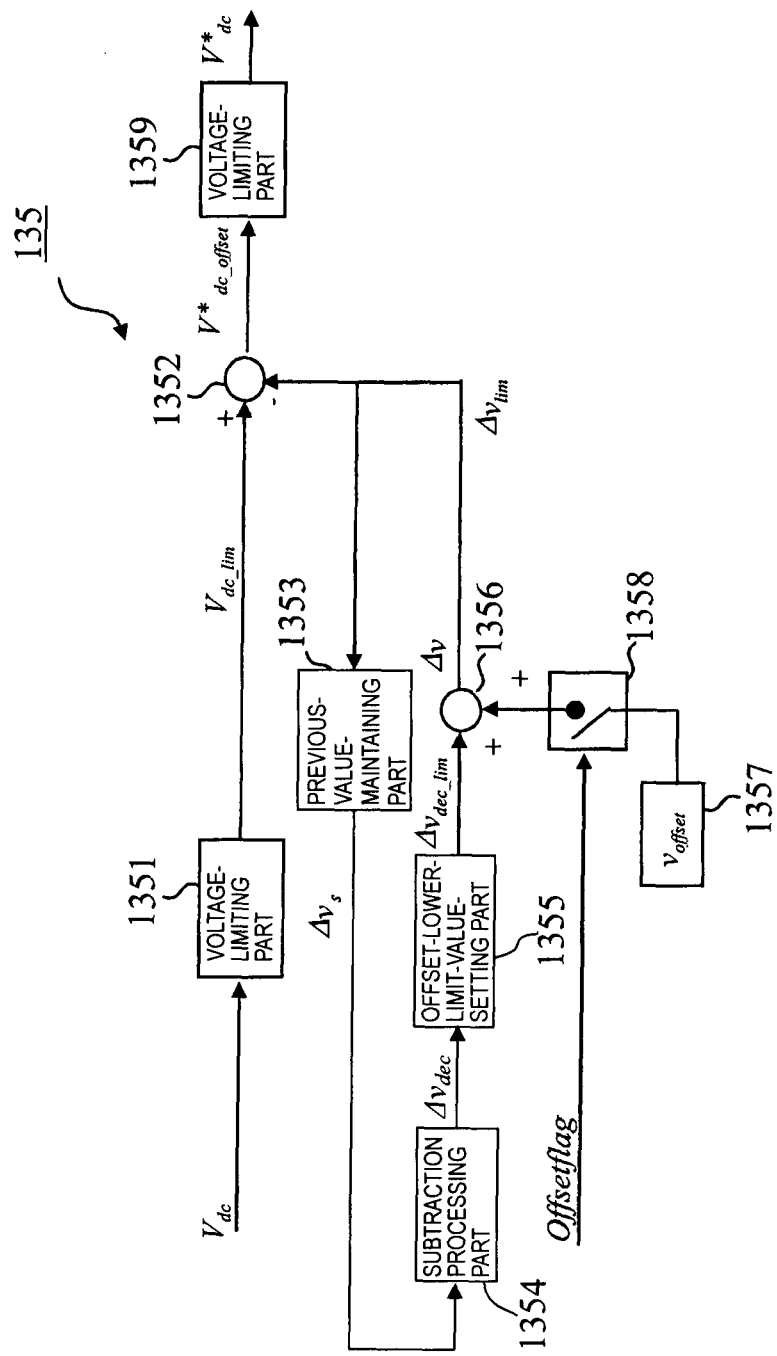
FIG. 4 is an example of a wiring block diagram of the map-reference-voltage-computing part of the motor controlling apparatus.

The map switcher 13 and the current-voltage map 1 will next be described in detail with reference to FIGS. 2 through 4. FIG. 2 is a diagram that shows an example of the maps stored in the current-voltage map 1. FIG. 3 is a block diagram that shows an example of components of the map switcher 13. FIG. 4 is a wiring block diagram showing an example of components of map-reference-voltage-computing part 135.

The current-voltage map 1 uses the torque command value (T*), the angular frequency ($\omega$), and the reference voltage ($V^*_{dc}$) as indices, references the maps shown in FIG. 2, and calculates and outputs the dq-axis current command values ($i^*_d$, $i^*_q$) and the dq-axis decoupled voltage command values ($V^*_{d\_dcpl}$, $V^*_{q\_dcpl}$). The maps stored in the current-voltage map 1 are a plurality of maps for rendering the angular frequency ($\omega$) and the torque command value (T*) into two axes for each of the reference voltages ($V^*_{dc}$). The maps are stored in advance in a memory (not shown) of the current-voltage map 1. Data representing the corresponding dq-axis current command values ($i^*_d$, $i^*_q$) and dq-axis decoupled voltage command values ($V^*_{d\_dcpl}$, $V^*_{q\_dcpl}$) is allocated at the two-axis lattice points. Command values corresponding to the torque command value (T*) and the angular frequency ($\omega$) for maximizing the efficiency of the inverter 6 at each of the voltages ($V^*_{dc}$) are set in the data representing the dq-axis current command values ($i^*_d$, $i^*_q$) and the dq-axis decoupled voltage command values ($V^*_{d\_dcpl}$, $V^*_{q\_dcpl}$). Since the range of modulation factors that allows stable driving of the inverter 6 is determined in advance, the command values included in the data are set so as to give the maximum value within the range of modulation factors. In each of the maps, when the torque command value (T*) and the angular frequency ($\omega$) are the same, the d-axis current command value ($i^*_d$) included in the data corresponding to the same torque command value (T*) and angular frequency ($\omega$) thereby increases on the negative side as the voltage ($V^*_{dc}$) of the maps decreases.

For example, as shown in FIG. 2, maps are allocated for each of the input voltages, e.g., $V^*_a$, $V^*_b$, $V^*_c$ (where $V^*_a > V^*_b > V^*_c$). Under conditions where the torque command value (T*) and the angular frequency ($\omega$) are the same, the data (command values) corresponding to the torque command value (T*) and the angular frequency ($\omega$) is extracted from the respective maps for each of $V^*_a$, $V^*_b$, $V^*_c$. In the map of the illustrated embodiment in this instance, the d-axis current command value ($i^*_d$) included in the data extracted from the map (voltage $V^*_c$) is the most negative value, the d-axis current command value ($i^*_d$) included in the data extracted from the map (voltage $V^*_b$) is the second most negative value, and the d-axis current command value ($i^*_d$) included in the data extracted from the map (voltage $V^*_a$) is the least negative value.

The range of settings for the torque command value (T*), the angular frequency ($\omega$), and the reference voltage ($V^*_{dc}$) in the maps of the current-voltage map 1 is set in advance on the basis of the range in which the operation of the inverter 6 can be guaranteed, the range of torques that allow input and output with respect to the motor 8, the rotational speeds that allow input and output, and other factors.

As shown in FIG. 3, the map switcher 13 includes a current-deviation-computing part 131, a $V_{a\_square}$-computing part 132, a threshold-value-computing part 133, an offset-determining part 134, and the map-reference-voltage-computing part 135. The current-deviation-computing part 131 computes the deviation between the current supplied from the inverter 6 to the motor 8 and the current command value. The deviation is computed for use as an index that represents whether or not the control state of the inverter 6 is stable. The deviation between the current supplied to the motor 8 and the current command value is given by the difference in current between the dq-axis current command values ($i^*_d$, $i^*_q$) and the dq-axis currents ($i_d$, $i_q$). Specifically, the current-deviation-computing part 131 uses the dq-axis current command values ($i^*_d$, $i^*_q$) output from the current-voltage map 1 and the dq-axis currents ($i_d$, $i_q$) output from the coordinate converter 10 as input, calculates current deviations ($\Delta d$, $\Delta q$) using Equations 4 and 5 below, and outputs the current deviations ($\Delta d$, $\Delta q$) to the offset-determining part 134.

$$\Delta d = i_d - i^*_d \quad (4)$$

$$\Delta q = i_q - i^*_q \quad (5)$$

The $V_{a\_square}$-computing part 132 computes a voltage ($V_{a\_square}$) as an index representing whether or not whether or not the control state of the inverter 6 is stable. The voltage ($V_{a\_square}$) corresponds to the magnitude of the vector of the dq-axis voltage command values ($V^*_d$, $V^*_q$) in the rotational coordinate system. Specifically, the $V_{a\_square}$-computing part 132 uses the dq-axis voltage command values ($V^*_d$, $V^*_q$) output from the current-voltage map 1 as input, calculates the voltage ($V_{a\_square}$) using Equation 6 below, and outputs the voltage ($V_{a\_square}$) to the offset-determining part 134.

$$v_{a\_square} = v^{*2}_d + v^{*2}_q \quad (6)$$

A low-pass filter may be inserted between the $V_{a\_square}$-computing part 132 and the offset-determining part 134 in order to remove pulses with respect to the voltage output from the $V_{a\_square}$-computing part 132 to the offset-determining part 134. When the low-pass filter is inserted, a voltage ($V_{flt}$) output from the $V_{a\_square}$-computing part 132 to the offset-determining part 134 is calculated using Equation 7 below $$v_{flt} = H_{LPF} v_{a\_square} \quad (7)$$

where $H_{LPF}$ represents the filter coefficient.

The threshold-value-computing part 133 computes a threshold value ($V_{ref}$) for determining voltage saturation as a threshold-determining value that represents whether or not the control state of the inverter 6 is stable. The threshold value ($V_{ref}$) for determining voltage saturation is a threshold value for determining whether or not the voltage range allowing output of the inverter 6 is exceeded and the voltage is saturated. The threshold value is calculated using Equation 8 below $$v_{ref} = K_{ref} V_{dc}^2 \qquad (8)$$

where $K_{ref}$ represents a predetermined coefficient.

The threshold-value-computing part 133 uses the detected voltage ($V_{dc}$) of the voltage detector as input, computes the threshold value ($V_{ref}$) for determining voltage saturation, and outputs the value to the offset-determining part 134. The offset-determining part 134 determines the control state of the inverter 6 on the basis of the current deviations ($\Delta d$, $\Delta q$), the voltage ($V_{a\_square}$), and the threshold value ($V_{ref}$) for determining voltage saturation. The offset-determining part 134 compares the current deviation ($\Delta d$) and a d-axis current-determining threshold value ($\Delta d_c$) and compares the current deviation ($\Delta q$) and a q-axis current-determining threshold value ($\Delta q_c$).

The d-axis current-determining threshold value ($\Delta d_c$) and the q-axis current-determining threshold value ($\Delta q_c$) are threshold values set in advance in the offset-determining part 134. During control of the inverter 6, the phase currents ($i_u$, $i_v$, $i_w$) detected by the current sensor 7 pulse in a given range with respect to the dq-axis current command values ($i^*_d$, $i^*_q$). The d-axis current-determining threshold value ($\Delta d_c$) and the q-axis current-determining threshold value ($\Delta q_c$) are set to be larger than the pulsing current threshold values so that the offset-determining part 134 does not make erroneous determinations concerning the changes in current due to the pulses.

The offset-determining part 134 determines that the control state of the inverter 6 is unstable when Equations (9) or (10) below is satisfied $$\Delta d < \Delta d_c \qquad (9)$$

$$\Delta q > \Delta q_c \qquad (10)$$

It is possible to have the offset-determining part 134 determine that the control state of the inverter 6 is unstable when the Equation (9) or (10) above is satisfied within a predetermined period of time. The phase currents ($i_u$, $i_v$, $i_w$) follow changes in the dq-axis current command values ($i^*_d$, $i^*_q$) with a first-order lag having a predetermined time constant. The predetermined time period is therefore set with respect to the time constant, whereby the determination precision can be increased.

The offset-determining part 134 also compares the voltage ($V_{a\_square}$) and the threshold value ($V_{ref}$) for determining voltage saturation, and makes a judgment that the control state of the inverter 6 is unstable when Equation (11) below is satisfied $$V_{a\_square} > V_{ref} \qquad (11)$$

When the offset-determining part 134 determines that the control state of the inverter 6 is unstable according to the aforementioned determination, an offset flag is turned on and output to the map-reference-voltage-computing part 135. On the other hand, when the aforementioned conditions are not satisfied, and the offset-determining part 134 determines that the control state of the inverter 6 is stable, the offset flag is turned off.

When the offset-determining part 134 detects an unstable state and turns on the offset flag, and the detected voltage ($V_{dc}$) is offset by the map-reference-voltage-computing part 135, the unstable state is transiently eliminated, an offset is continuously produced, and the offset value may become excessive. It is therefore possible to have the offset-determining part 134 turn on the offset flag for only one control cycle and to turn the flag off in the next control cycle. The transient period in which the unstable state is eliminated is restricted by the offset flag being on. Once a time period that is set in advance has elapsed, the offset-determining part 134 makes another on/off determination concerning the offset flag. When the unstable state has not been eliminated, the offset is made again by the map-reference-voltage-computing part 135.

The map-reference-voltage-computing part 135 will be described next with regard to FIG. 4. As described below, the map-reference-voltage-computing part 135 induces graded offsets in the detected voltage ($V_{dc}$), which is detected by the voltage detector 14, according to the control state of the inverter 6, and outputs the reference voltage ($V^*_{dc}$). The map-reference-voltage-computing part 135 is provided with a voltage-limiting part 1351, a subtractor 1352, a previous-value-maintaining part 1353, a subtraction processing part 1354, a offset-lower-limit-value-setting part 1355, an adder 1356, an offset-value-setting part 1357, a switch 1358, and a voltage-limiting part 1359.

The voltage-limiting part 1351 sets an upper-limit voltage value ($V_{dc\_lim}$) with respect to the detected voltage ($V_{dc}$). The upper-limit voltage value ($V_{dc\_lim}$) corresponds to the highest reference voltage ($V^*_{dc}$) among the maps stored in the current-voltage map 1. When a voltage that is higher than the upper-limit voltage value ($V_{dc\_lim}$) is input to the current-voltage map 1, the current-voltage map 1 cannot make reference to an appropriate map with respect to the input voltage. The voltage-limiting part 1351 is therefore used to provide an upper limit to the detected voltage ($V_{dc}$), whereby an upper limit can also be provided to the reference voltage ($V^*_{dc}$) input to the current-voltage map 1. When the detected voltage ($V_{dc}$) is higher than the upper-limit voltage value ($V_{dc\_lim}$), the voltage-limiting part 1351 outputs the upper-limit voltage value ($V_{dc\_lim}$) to the subtractor 1352 as an output voltage value ($V_{dc\_lim}$). On the other hand, when the detected voltage ($V_{dc}$) is less than or equal to the upper-limit voltage value ($V_{dc\_lim}$), the voltage-limiting part 1351 does not apply a limit to the voltage value, and the detected voltage ($V_{dc}$) is output to the subtractor 1352 as the output voltage value ($V_{dc\_lim}$).

The previous-value-maintaining part 1353 saves a previous offset value ($\Delta V_s$) set by the control loop for setting the offset value as discussed below. The initial value of the previous offset value ($\Delta V_s$) is zero. The subtraction processing part 1354 subtracts an offset subtraction value ($V_m$) from the previous offset value ($\Delta V_s$), whereby the previous offset value ($\Delta V_s$) is subtractively processed towards 0V. The offset subtraction value ($V_m$) is the amount of change in the voltage for each unit of time and is set in advance. The offset subtraction value is set to a smaller value than an offset value ($V_{offset}$) described below. The subtraction process returns the voltage offset by the offset value ($\Delta V_s$) to a voltage that is not offset. The offset subtraction value ($V_m$) is fixed at a predetermined value in the subtraction processing part 1354, and therefore limits are placed on the amount of change in the offset during the subtraction process. The subtraction processing part 1354 subtracts the offset subtraction value ($V_m$) from the previous offset value ($\Delta V_s$), whereby an offset value ($\Delta V_{dec}$) is calculated and output to the offset-lower-limit-value-setting part 1355.

A lower-limit value is set for the offset value ($\Delta V_{dec}$) in the offset-lower-limit-value-setting part 1355. The offset-lower-limit-value-setting part 1355 places a limit on the offset value ($\Delta V_{dec}$) and outputs an offset value ($\Delta V_{dec\_lim}$) to the adder 1356. In cases where the subtraction process results in a negative offset value ($\Delta V_{dec}$) when the negative offset value ($\Delta V_{dec}$) is subtracted in the subtractor 1352, an offset is induced in the opposite direction from the detected voltage ($V_{dc}$), and the result cannot converge to the original detected voltage ($V_{dc}$). When the offset value ($\Delta V_{dec}$) is negative, the offset-lower-limit-value-setting part 1355 therefore uses the previously subtractively processed offset value ($\Delta V_s$) as the offset value ($\Delta V_{dec\_lim}$) instead of the subtractively processed offset value ($\Delta V_{dec}$) and outputs this value to the adder 1356. On the other hand, when the offset value ($\Delta V_{dec}$) greater than or equal to zero, the offset-lower-limit-value-setting part 1355 outputs the subtractively processed offset value ($\Delta V_{dec}$) as the offset value ($\Delta V_{dec\_lim}$).

The offset value ($V_{offset}$) is set in advance in the offset-value-setting part 1357. The offset value ($V_{offset}$) represents the magnitude of the offset value that is offset by the control (the control loop shown in FIG. 4) performed each time in the map-reference-voltage-computing part 135. Setting the offset value ($V_{offset}$) to a large value allows the offset value of the detected voltage ($V_{dc}$) for each unit time to be increased.

The switch 1358 controls the on and off states of the output line from the offset-value-setting part 1357 to the adder 1356. When the offset flag from the offset-determining part 134 is on, the switch 1358 is turned on, and the offset value ($V_{offset}$) is input from the offset-value-setting part 1357 to the adder 1356. On the other hand, when the offset flag from the offset-determining part 134 is off, the switch 1358 is off, and the offset value ($V_{offset}$) is not input from the offset-value-setting part 1357 to the adder 1356. In other words, when the switch 1358 is on, offset processing is performed in the control loop on the basis of the offset value ($V_{offset}$), and when the switch 1358 is off, offset processing is not performed in the control loop on the basis of the offset value ($V_{offset}$).

The adder 1356 adds the output of the offset-lower-limit-value-setting part 1355 and the output of the switch 1358, and outputs an offset value ($\Delta V$) to the subtractor 1352 and the previous-value-maintaining part 1353. In other words, when the switch 1358 is on, the offset value ($\Delta V$) is the offset value ($V_{offset}$) added to the offset value ($\Delta V_{dec\_lim}$). On the other hand, when the switch 1358 is off, the offset value ($\Delta V$) is the offset value ($\Delta V_{dec\_lim}$). When the offset value ($\Delta V$) is input to the previous-value-maintaining part 1353, the value is saved as the previous offset value ($\Delta V_s$).

The subtractor 1352 subtracts the offset value ($\Delta V$) from the output voltage value ($V_{dc\_lim}$) of the voltage-limiting part 1351, and outputs a voltage ($V_{dc\_offset}$) to the voltage-limiting part 1359. The detected voltage ($V_{dc}$) is thereby offset.

The voltage-limiting part 1359 sets a lower-limit voltage value ($V_{dc\_l}$) in relation to the offset detected voltage ($V_{dc\_offset}$). The lower-limit voltage value ($V_{dc\_l}$) corresponds to the lowest reference voltage ($V^*_{dc}$) among the maps stored in the current-voltage map 1. When a voltage less than the lower-limit voltage value ($V_{dc\_l}$) is offset and input to the current-voltage map 1, the current-voltage map 1 cannot make reference to an appropriate map with respect to the input voltage. The voltage-limiting part 1359 is therefore used to provide a lower limit to the detected voltage ($V_{dc\_offset}$), whereby a lower limit can also be provided to the reference voltage ($V^*_{dc}$) input to the current-voltage map 1. When the detected voltage ($V_{dc\_offset}$) is less than the lower-limit voltage value ($V_{dc\_l}$), the voltage-limiting part 1359 outputs the lower-limit voltage value ($V_{dc\_l}$) as the reference voltage ($V^*_{dc}$). On the other hand, when the detected voltage ($V_{dc\_offset}$) greater than or equal to the lower-limit voltage value ($V_{dc\_l}$), the voltage-limiting part 1359 does not place limitations on the voltage value, and the detected voltage ($V_{dc\_offset}$) is output as the reference voltage ($V^*_{dc}$).

The reference voltage ($V^*_{dc}$) that is the output of the voltage-limiting part 1359 is input to the current-voltage map 1. The current-voltage map 1 uses the reference voltage ($V^*_{dc}$) as input and calculates the dq-axis current command values ($i^*_d, i^*_q$) and the dq-axis decoupled voltage command values ($V^*_{d\_dcpl}, V^*_{q\_dcpl}$), as described above.

Figure 5:
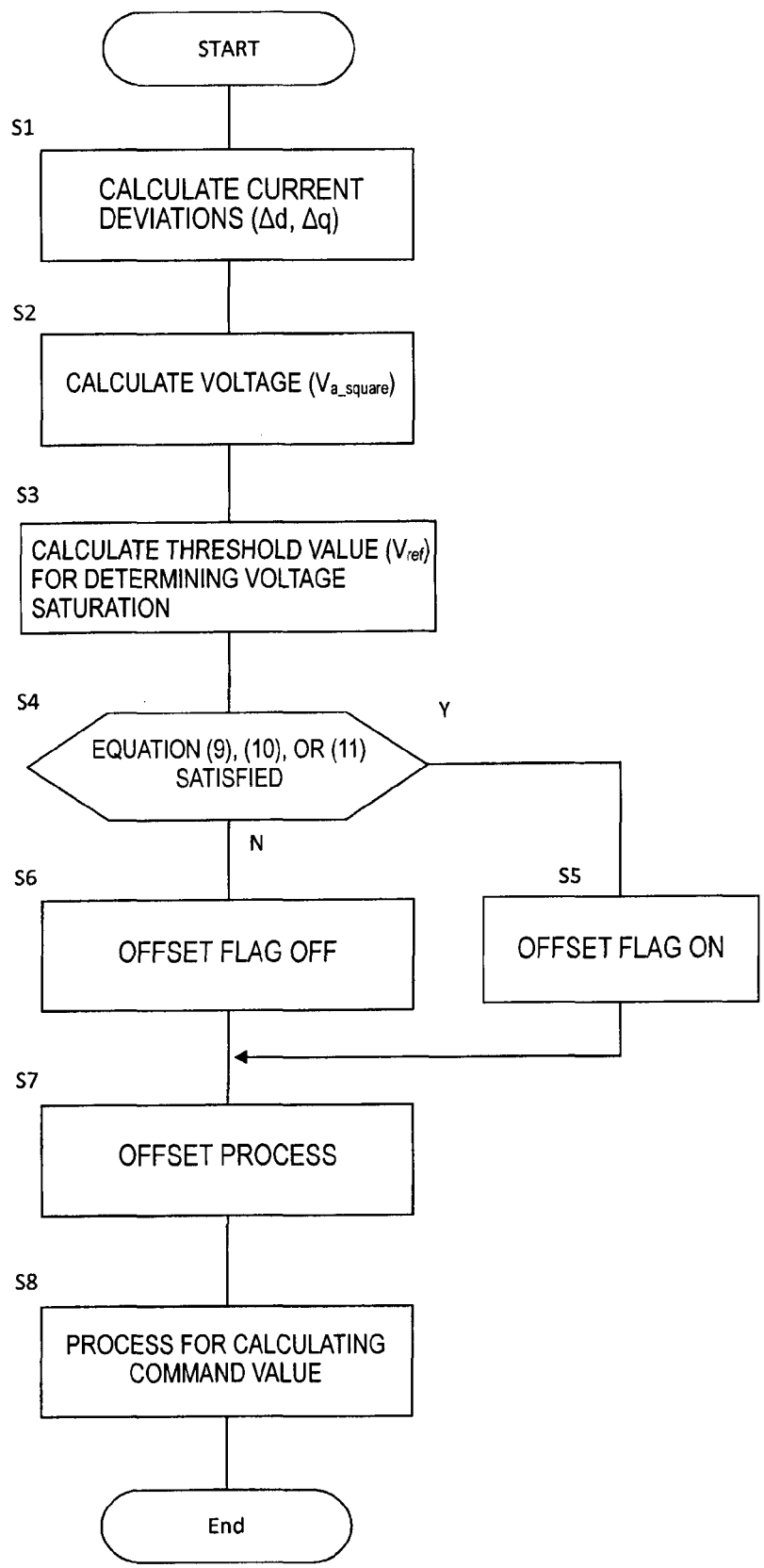
FIG. 5 is a flowchart that shows an example of operations performed by the motor controlling apparatus.
Figure 6:
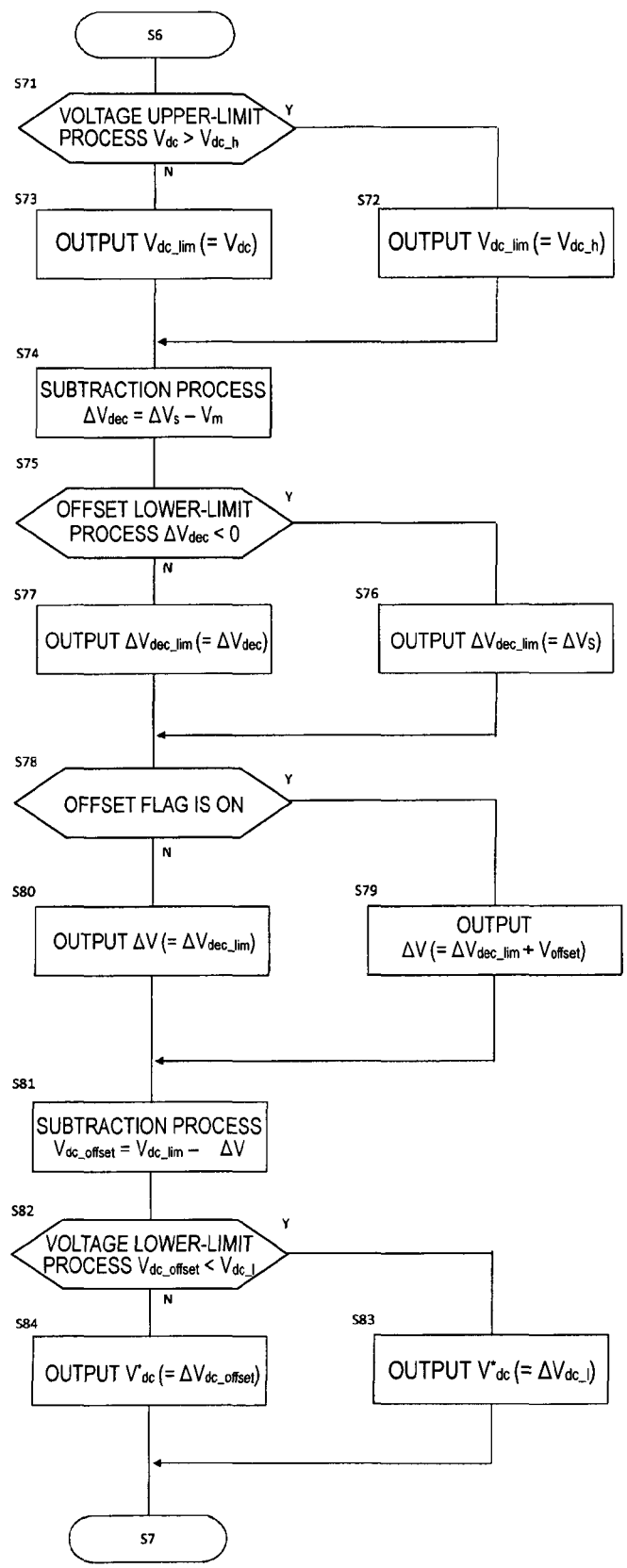
FIG. 6 is a flowchart that shows an example of operations of the control sequence operation in the flowchart of FIG. 5.

Among the control processes of the motor controlling apparatus of the illustrated embodiment, examples of the process for determining the control state of the inverter 6, the process for offsetting the detected voltage on the basis of the results of the determination process, and the process for computing the dq-axis current command values ($i^*_d, i^*_q$) using the maps will now be described with regard to FIGS. 5 and 6. FIG. 5 is a flowchart that shows an example of operations performed by the motor controlling apparatus of the illustrated embodiment. FIG. 6 is a flowchart that shows an example of operations of the control sequence in step S7 of FIG. 5.

In step S1, the current-deviation-computing part 131 retrieves the difference in current between the dq-axis current command values ($i^*_d, i^*_q$) and the dq-axis currents ($i_d, i_q$), calculates the current deviations ($\Delta d, \Delta q$), and outputs to the offset-determining part 134. In step S2, the $V_{a\_square}$-computing part 132 computes the voltage ($V_{a\_square}$) from the dq-axis voltage command values ($V^*_d, V^*_q$) and outputs to the offset-determining part 134. In step S3, the threshold-value-computing part 133 computes the threshold value ($V_{ref}$) for determining voltage saturation from the detected voltage ($V_{dc}$) of the voltage detector and outputs to the offset-determining part 134.

In step S4, the offset-determining part 134 determines whether or not Equation 9, 10, or 11 is satisfied on the basis of the current deviations ($\Delta d, \Delta q$), the voltage ($V_{a\_square}$), and the threshold value ($V_{ref}$) for determining voltage saturation computed in steps S2, S3, and S4. When Equation 9, 10, or 11 is satisfied, the offset-determining part 134 turns on the offset flag in step S5. On the other hand, when Equation 9, 10, or 11 is not satisfied, the offset-determining part 134 turns off the offset flag in step S6. In step S7, the map-reference-voltage-computing part 135 performs the offset process shown in FIG. 6.

As shown in FIG. 6, in step S71, the voltage-limiting part 1351 compares the detected voltage ($V_{dc}$) and the upper-limit voltage value ($V_{dc\_h}$) in order to place a limit on the upper value of the detected voltage ($V_{dc}$). When the detected voltage ($V_{dc}$) is higher than the upper-limit voltage value ($V_{dc\_h}$), the voltage-limiting part 1351 limits the detected voltage ($V_{dc}$) to the upper-limit voltage value ($V_{dc\_h}$) and outputs the upper-limit voltage value ($V_{dc\_h}$) as the output voltage value ($V_{dc\_lim}$) in step S72. On the other hand, when the detected voltage ($V_{dc}$) is equal to or less than the upper-limit voltage value ($V_{dc\_h}$), the voltage-limiting part 1351 does not place limits on the detected voltage ($V_{dc}$) and outputs the detected voltage ($V_{dc}$) as the output voltage value ($V_{dc\_lim}$) in step S73.

In step S74, the subtraction processing part 1354 subtracts the offset subtraction value ($V_m$) from the offset value ($\Delta V_s$) saved in the previous-value-maintaining part 1353, whereby the offset value ($\Delta V_{dec}$) is computed and output to the offset-lower-limit-value-setting part 1355. In step S75, the offset-lower-limit-value-setting part 1355 determines whether or not the offset value ($\Delta V_{dec}$) is less than 0 V in order to place limits on the lower-limit value of the offset value ($\Delta V_{dec}$). When the offset value ($\Delta V_{dec}$) is less than 0 V, the offset-lower-limit-value-setting part 1355 outputs the offset value ($\Delta V_s$) as the offset value ($V_{dec\_lim}$) in step S76. On the other hand, when the offset value ($\Delta V_{dec}$) is higher than 0 V, the offset-lower-limit-value-setting part 1355 outputs the offset value ($\Delta V_{dec}$) as the offset value ($V_{dec\_lim}$) in step S77.

In step S78, the switch 1358 turns the switch on when the offset flag has been set to "on" in step S5. In step S79, the adder 1356 adds the offset value ($V_{offset}$) to the offset value ($\Delta V_{dec\_lim}$) and outputs the offset value ($\Delta V$). On the other hand, when the offset flag has been set to "off" in step S6, the switch 1358 turns the switch off, and the adder 1356 does not perform addition processing on the basis of the offset value ($V_{offset}$). Thus, the offset value ($\Delta V_{dec\_lim}$) is output as the offset value ($\Delta V$) in step S80.

In step S81, the subtractor 1352 subtracts the offset value ($\Delta V$) from the output voltage value ($V_{dc\_lim}$) of the voltage-limiting part 1351, whereby the voltage ($V_{dc\_offset}$) is computed and output to the voltage-limiting part 1359. In step S82, the voltage-limiting part 1359 compares the voltage ($V_{dc\_offset}$) and the lower-limit voltage value ($V_{dc\_1}$) in order to place a limit on the lower value of the voltage ($V_{dc\_offset}$). When the voltage ($V_{dc\_offset}$) is less than the lower-limit voltage value ($V_{dc\_1}$), the voltage-limiting part 1359 limits the voltage ($V_{dc\_offset}$) to the lower-limit voltage value ($V_{dc\_1}$), and outputs the lower-limit voltage value ($V_{dc\_1}$) as the reference voltage ($V^*_{dc}$) in step S83. On the other hand, when the voltage ($V_{dc\_offset}$) is greater than or equal to the lower-limit voltage value ($V_{dc\_1}$), the voltage-limiting part 1359 does not place limits on the voltage ($V_{dc\_offset}$), and the voltage ($V_{dc\_offset}$) is output as the reference voltage ($V^*_{dc}$) in step S84. The map switcher 13 outputs the reference voltage ($V^*_{dc}$) to the current-voltage map 1, whereby the process of step S7 shown by steps S71 through S84 ends, and the operations proceed to step S8 shown in FIG. 5.

Returning to FIG. 5, in step S8, the current-voltage map 1 extracts the map corresponding to the reference voltage ($V^*_{dc}$) and calculates and outputs the dq-axis current command values ($i^*_d$, $i^*_q$) and the dq-axis decoupled voltage command values ($V^*_{d\_dcpl}$, $V^*_{q\_dcpl}$) from the data corresponding to the intersection of the torque command value ($T^*$) and the angular frequency ($\omega$). The reference voltage ($V^*_{dc}$) is thereby the result of offsetting the detected voltage ($V_{dc}$). The maps are configured so that the d-axis current command value ($i^*_d$) increases on the negative side as the reference voltage ($V^*_{dc}$) decreases. Therefore, the d-axis current command value ($i^*_d$) output from the current-voltage map is more negative than the d-axis current command value ($i^*_d$) derived from the map corresponding to the detected voltage ($V_{dc}$).

When the process of step S8 ends, the motor controlling apparatus of the illustrated embodiment returns to step S1, and the control process shown in FIGS. 5 and 6 is repeated. In other words, when the control state of the inverter 6 remains in an unstable state, and the offset-determining part 134 causes the offset flag to remain in the "on" state, the offset value ($\Delta V$) increases during each process loop. In other words, in the illustrated embodiment, the detected voltage ($V_{dc}$) is offset a plurality of times, whereby the offset process can be performed in stages, the reference voltage ($V^*_{dc}$) can be gradually decreased, and the d-axis current command value ($i^*_d$) can be gradually increased. The illustrated embodiment can therefore prevent large instantaneous changes from occurring in the d-axis current command value, and the efficiency of the inverter can be prevented from declining.

As described above, when the d-axis current command value ($i^*_d$) is increased, and the control state of the inverter 6 returns to a stable state, the offset value is subjected to subtraction processing by the subtraction processing part 1354 in the illustrated embodiment in a state in which the offset flag is "off." The amount of change for each time period is limited by the offset subtraction value ($V_m$) during subtraction processing. The amount of change in the subtraction process is therefore smaller than the amount of change in offset processing based on the offset value ($V_{offset}$), and the offset reference voltage ($V^*_{dc}$) can be returned to the original detected voltage ($V_{dc}$) that was not offset.

As described above, in the illustrated embodiment, the map switcher 13 offsets the detected voltage ($V_{dc}$) using the offset value ($\Delta V$) according to the control state of the inverter 6, and the current-voltage map 1 uses the offset detected voltage ($V^*_{dc}$) as input, calculates the dq-axis current command values ($i^*_d$, $i^*_q$) and the dq-axis decoupled voltage command values ($V^*_{d\_dcpl}$, $V^*_{q\_dcpl}$), and increases the d-axis current command value ($i^*_d$) on the negative side. Increasing the d-axis current command value ($i^*_d$) on the negative side thereby enhances a field-weakening effect, restricts the voltage applied to the motor 8, and allows the inverter 6 to be stably controlled.

In contrast to the illustrated embodiment, when the input value that serves as the index of the current command value is not changed when the d-axis current command value ($i^*_d$) increases on the negative side, the current command value for optimizing the efficiency of the inverter will be departed from on the map when the dq-axis current command values ($i^*_d$, $i^*_q$) are shifted, and the efficiency of the inverter may therefore decline. When the shift in the current command value is large, a current that is weaker than necessary may flow, and the efficiency of the inverter may decline. The detected voltage ($V_{dc}$) that serves as the index for the map is offset in the illustrated embodiment, and therefore the data for the current command value for optimizing the efficiency of the inverter 6 is allocated to the map corresponding to the voltage ($V^*_{dc}$) after offsetting. The current command value extracted from this map is a value that will not cause a large decline in the efficiency of the inverter 6. On the contrary, in the illustrated embodiment, the d-axis current command value is thereby increased on the negative side, and the efficiency of the inverter 6 can be prevented from greatly declining, while the control state of the inverter 6 is stabilized.

Furthermore, in the illustrated embodiment, the q-axis current command value is also calculated with reference to the map corresponding to the offset voltage ($V^*_{dc}$) at the same time as the d-axis current command value is being increased. Therefore the actual torque can be prevented from diverging from the torque command value ($T^*$).

In addition, in the illustrated embodiment, the maps stored in the current-voltage map 1 are formed so that under a condition in which the torque command value ($T^*$) and the angular frequency ($\omega$) are the same, and the d-axis current command value ($i^*_d$) corresponding to the offset detected voltage ($V^*_{dc}$) is greater on the negative side than the d-axis current command value ($i^*_d$) corresponding to the detected voltage ($V_{dc}$) that has not been offset. Offsetting the detected voltage ($V_{dc}$) thereby causes the d-axis current command value ($i^*_d$) to increase on the negative side, and therefore the inverter 6 is controlled on the basis of the optimal d-axis current command value ($i^*_d$), the efficiency of the inverter 6 does not greatly decline, and a state of insufficient voltage can be eliminated.

Moreover in the illustrated embodiment, the map switcher 13 offsets the detected voltage ($V_{dc}$) in stages until the control state of the inverter 6 stabilizes. The detected voltage ($V_{dc}$) is thereby gradually offset, and the d-axis current command value ($i^*_d$) is gradually increased; therefore the d-axis current command value ($i^*_d$) can be increased by the increments necessary for stabilizing the control state of the inverter 6. As a result, the efficiency of the inverter 6 can be prevented from greatly declining.

As discussed above, the voltage ($V_{a\_square}$) and the threshold value ($V_{ref}$) for determining voltage saturation are compared in the illustrated embodiment, whereby the control state of the inverter 6 is determined on the basis of the modulation factor of the inverter 6, and the detected voltage ($V_{dc}$) is offset when the control state of the inverter 6 is unstable. As can be appreciated from the above, Equation 11 is derived from the proportion of voltage supplied to the motor 8 with respect to the detected voltage ($V_{dc}$) of the battery 5, and this Equation corresponds to the modulation factor of the inverter 6. In other words, the comparison according to Equation 11 corresponds to a comparison between the modulation factor of the inverter 6 and a predetermined modulation factor. The modulation factor is thereby used as an offset condition in the illustrated embodiment. Accordingly, control of the inverter 6 can be stabilized in response to voltage insufficiency resulting from sensor variability of the current sensor 7 and the magnetic-pole-position detector 9, voltage insufficiency resulting from temperature changes in the motor 8, voltage insufficiency when increases in rotational speed or output cause operation in regions of overmodulation, or other factors. Control of the inverter 6 can also be stabilized in response to divergence between the current command values ($i^*_d$, $i^*_q$) and the actual currents.

Also, in the illustrated embodiment, the current deviations ($\Delta d$, $\Delta q$) are compared to the d-axis current-determining threshold value ($\Delta d_c$) or the q-axis current-determining threshold value ($\Delta q_c$), and a determination is made concerning the control state of the inverter 6 on the basis of the results of the comparison. The detected voltage ($V_{dc}$) is offset when the control state of the inverter 6 is unstable. The current deviations ($\Delta d$, $\Delta q$) can thereby be prevented from increasing, and the divergence between the torque command value (T*) and the actual torque can be limited.

The conditions based on the aforementioned modulation factor and the conditions based on the current deviations may be used together in the illustrated embodiment. A determination that the inverter 6 is unstable can thereby be made on the basis of the current deviations before the modulation factor exceeds a predetermined modulation factor, and control is destabilized. Therefore, the time period in which the current deviations increase can be shortened, and the time period in which the divergence between the torque command value (T*) and the actual torque increases can be restricted.

When the control state of the inverter 6 has moved from an unstable state to a stable state in the illustrated embodiment, the offset voltage ($V^*_{dc}$) is returned to the detected voltage ($V_{dc}$) by amounts of change that are less than the offset value ($V_{offset}$) Offsetting can thereby occur quickly when necessary, and unstable operational points can be avoided early, whereby voltage insufficiency, current deviations, and the like are avoided, and control of the inverter 6 can be stabilized. On the other hand, when the offset state is returned to the original state gradually, overshooting of the modulation factor, offset hunting and destabilization, and other phenomena can be prevented.

As discussed above, the offset subtraction value ($V_m$) is used in the method for returning the offset state to the original state in the illustrated embodiment, whereby limits are placed on the amount of change. However, passage through a first-order lag filter may also be used to limit the amount of change and slowly return to the original state.

Furthermore, the offset value ($V_{offset}$) may be set to a level such that merely offsetting the detected voltage ($V_{dc}$) causes the d-axis current command value ($i^*_d$) to increase. The offset value ($V_{offset}$) may be set so that the voltage ($V^*_{dc}$) that is offset on the basis of the offset value ($V_{offset}$) falls within a range of voltages allocated to the maps.

Also, as can be appreciated from the above, the offset value ($V_{offset}$) or the offset value ($\Delta V$) of the illustrated embodiment corresponds to the "predetermined offset amount." The voltage detector 14 can be considered to correspond to a "voltage-detecting means," and the magnetic-pole-position detector 9 and the rotational-speed calculator 11 can be considered to correspond to "means for detecting motor rotational speed." In addition, the current-voltage map 1 can be considered to correspond to "command-value-calculating means," and the PWM converter 4 can be viewed as corresponding to "inverter-controlling means." Furthermore, the map-reference-voltage-computing part 135 can be considered to correspond to "offsetting means," and the current sensor 7 can be considered to correspond to "current-detecting means." Also, the current-deviation-computing part 131, the $V_{a\_square}$-computing part 132, the threshold-value-computing part 133 and the offset-determining part 134 can be considered to correspond to "state-detecting means."

Figure 7:
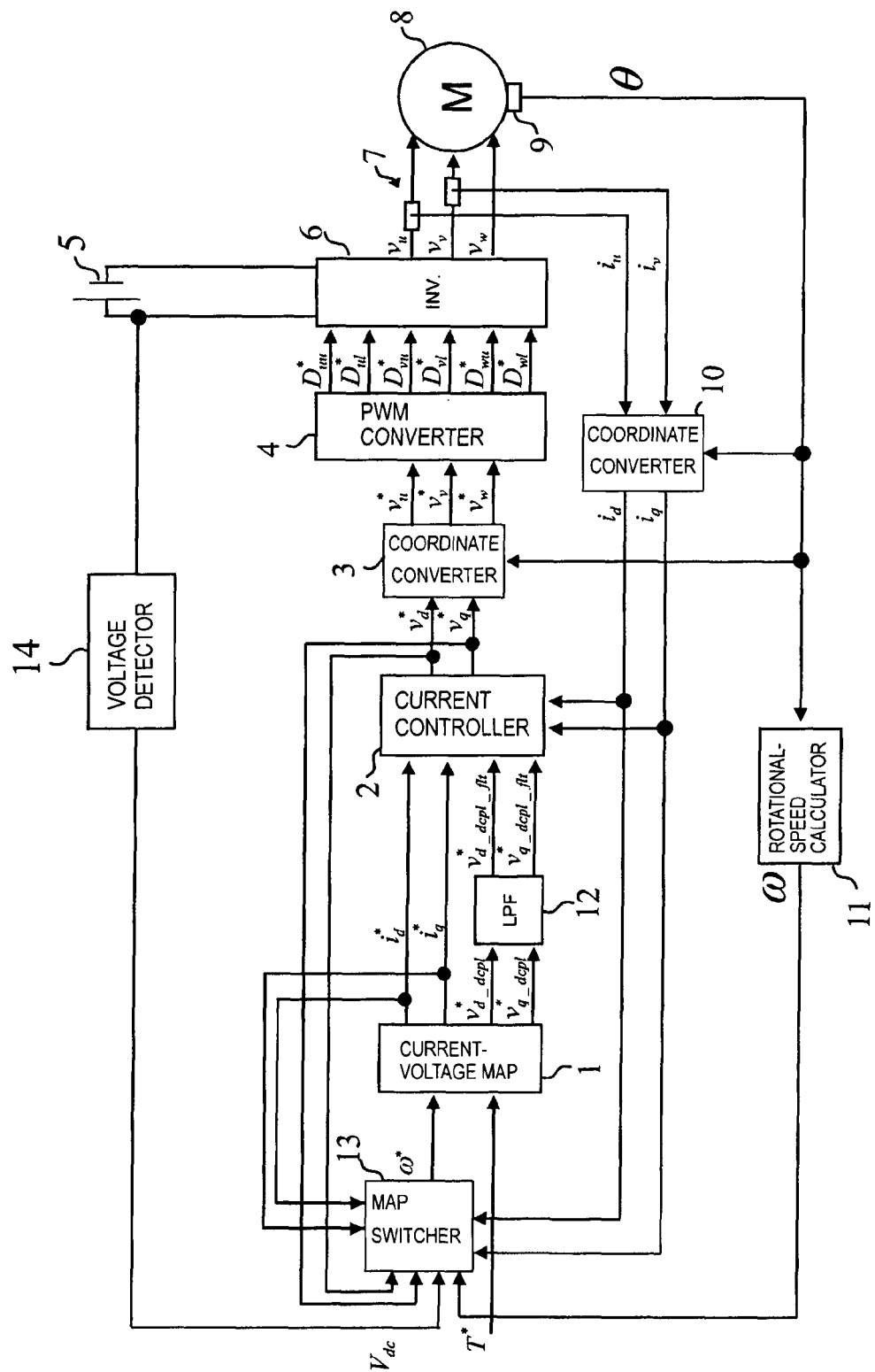
FIG. 7 is a block diagram of a motor controlling apparatus according to another disclosed embodiment.

FIG. 7 is a block diagram of an example of a motor controlling apparatus according to another disclosed embodiment. As indicated, the configuration of the current-voltage map 1 and the map switcher 13 differs from the corresponding components in the aforementioned first embodiment. The configuration of the other components in the embodiment shown in FIG. 7 are the same or similar to the corresponding components in the aforementioned first embodiment, and descriptions will therefore be referenced as appropriate.

As shown in FIG. 7, the angular frequency ($\omega$) output from the rotational-speed calculator 11 is input to the map switcher 13 that is included in the motor controlling apparatus of the illustrated embodiment. The map switcher 13 determines the control state of the coordinate converter 3, offsets the angular frequency ($\omega$) according the control state determined, and outputs a reference angular frequency ($\omega^*$) to the current-voltage map 1. When the control state of the inverter 6 is unstable, the map switcher 13 offsets the angular frequency ($\omega$) and outputs the offset angular frequency as the reference angular frequency ($\omega^*$). On the other hand, when the control state of the inverter 6 is stable, the map switcher 13 outputs the angular frequency ($\omega$) as the reference angular frequency ($\omega^*$) without offsetting the angular frequency ($\omega$). The configuration of the map switcher 13 is described in detailed below.

Figure 8:
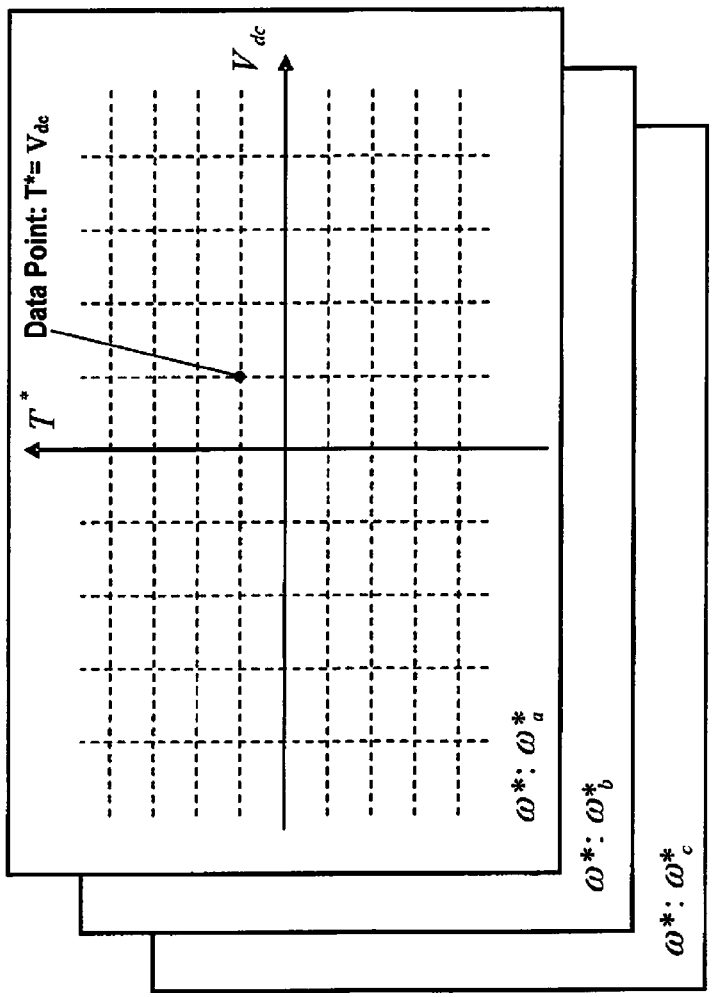
FIG. 8 is a diagram illustrating an example of maps stored as current-voltage maps in the motor controlling apparatus shown in FIG. 7.

The current-voltage map 1 will next be described in detail using FIG. 8. FIG. 8 is a diagram that shows an example of the maps stored in the current-voltage map 1.

The current-voltage map 1 uses the torque command value (T*), the reference angular frequency ($\omega^*$), and the detected voltage ($V_{dc}$) as indices, references the maps shown in FIG. 8, and calculates and outputs the dq-axis current command values ($i^*_d$, $i^*_q$) and the dq-axis decoupled voltage command values ($V^*_{d\_dcpl}$, $V^*_{q\_dcpl}$). The maps stored in the current-voltage map 1 are a plurality of maps for rendering the detected voltage ($V_{dc}$) and the torque command value (T*) into two axes for each of the reference angular frequencies ($\omega^*$). The maps are stored in advance in the memory (not shown) of the current-voltage map 1. Data representing the corresponding dq-axis current command values ($i^*_d$, $i^*_q$) and dq-axis decoupled voltage command values ($V^*_{d\_dcpl}$, $V^*_{q\_dcpl}$) is allocated at the two-axis lattice points. Command values corresponding to the torque command value (T*) and the detected voltage ($V_{dc}$) for maximizing the efficiency of the inverter 6 at each of the reference angular frequencies ($\omega^*$) are set in the data representing the dq-axis current command values ($i^*_d$, $i^*_q$) and the dq-axis decoupled voltage command values ($V^*_{d\_dcpl}$, $V^*_{q\_dcpl}$) Since the range of modulation factors that allows stable driving of the inverter 6 is set in advance, the command values included in the data are set so as to give the maximum value within the range of modulation factors. In each of the maps, when the torque command value (T*) and the detected voltage ($V_{dc}$) are the same, the d-axis current command value ($i^*_d$) included in the data corresponding to the same torque command value (T*) and detected voltage ($V_{dc}$) thereby increases on the negative side as the reference angular frequency ($\omega^*$) of the maps increases. For example, as shown in FIG. 8, maps are allocated for each of the input reference angular frequencies, e.g., $\omega^*_a$, $\omega^*_b$, $\omega^*_c$ (where $\omega^*_a > \omega^*_b > \omega^*_c$). Under conditions where the torque command value (T*) and the detected voltage ($V_{dc}$) are the same, the data (command values) corresponding to the torque command value (T*) and the detected voltage ($V_{dc}$) is extracted from the respective maps for each of $\omega^*_a$, $\omega^*_b$, $\omega^*_c$. In the maps of this embodiment, the d-axis current command value ($i^*_d$) that is included in the data extracted from the map (reference angular frequency $\omega^*_a$) is the most negative value. Also, the d-axis current command value ($i^*_d$) that is included in the data extracted from the map (reference angular frequency $\omega^*_b$) is the second most negative value, and the d-axis current command value ($i^*_d$) that is included in the data extracted from the map (reference angular frequency $\omega^*_c$) is the least negative value. The range of settings for the torque command value (T*), the detected voltage ($V_{dc}$), and the reference angular frequency ($\omega^*$) in the maps of the current-voltage map 1 is set in advance on the basis of the range in which the operation of the inverter 6 can be guaranteed, the range of torques that allow input and output with respect to the motor 8, the rotational speeds that allow input and output, and other factors.

Figure 9:
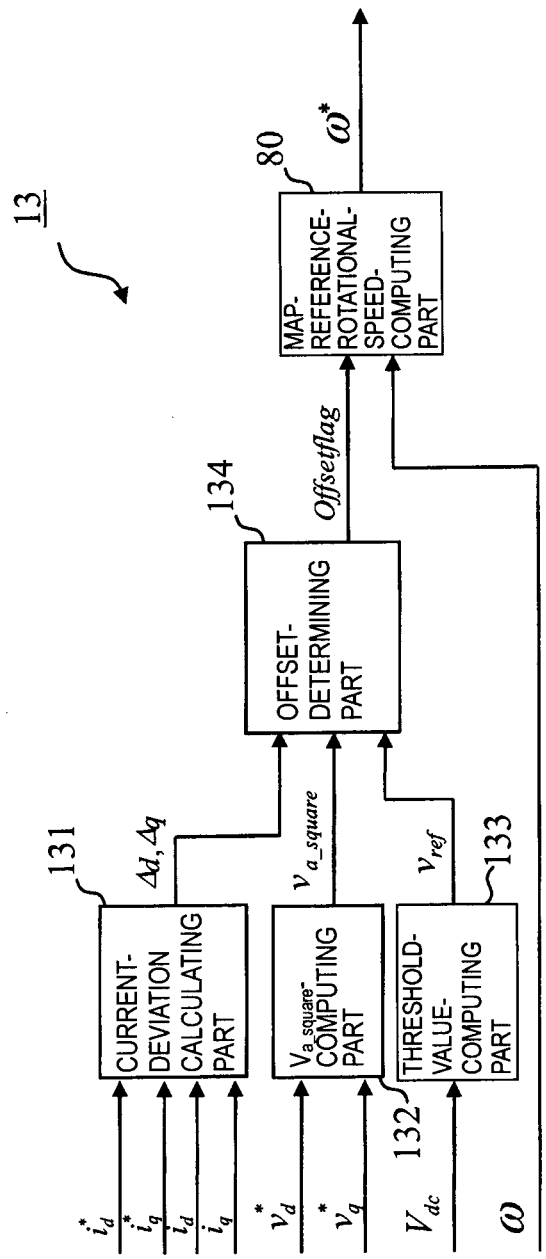
FIG. 9 is a block diagram illustrating an example of the map switcher of the motor controlling apparatus shown in FIG. 7.
Figure 10:
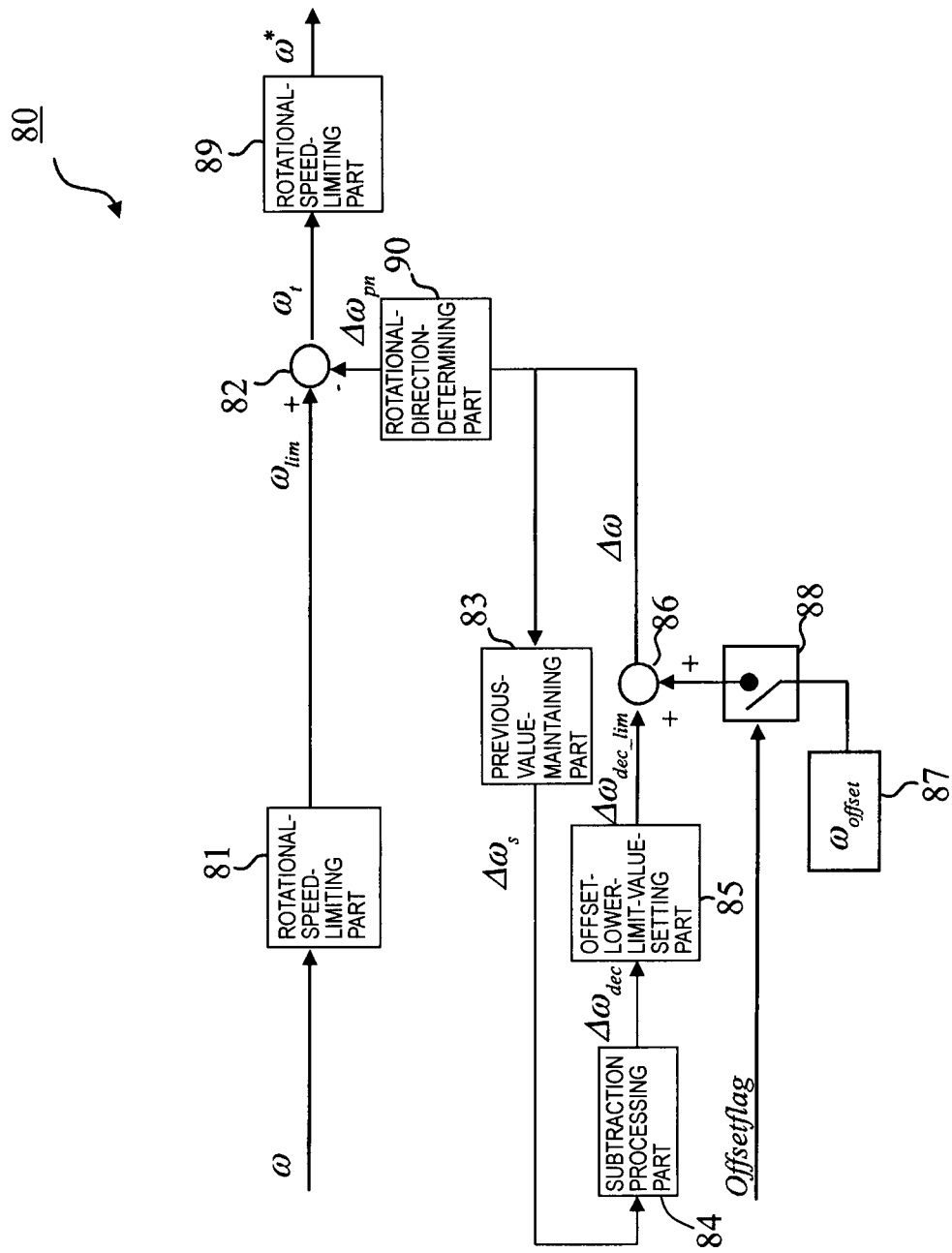
FIG. 10 is an example of a wiring block diagram of the map-reference-rotational-speed-computing part of the motor controlling apparatus shown in FIG. 7.

The map switcher 13 will next be described in detail with regard to FIGS. 8 through 10. As discussed above, FIG. 8 is a diagram that shows an example of the maps stored in the current-voltage map 1. FIG. 9 is a block diagram that shows an example of the map switcher 13. FIG. 10 is a wiring block diagram of an example of a map-reference-rotational-speed-computing part 80.

As shown in FIG. 9, the map switcher 13 includes the current-deviation-computing part 131, the $V_{a\_square}$-computing part 132, the threshold-value-computing part 133, the offset-determining part 134, and the map-reference-rotational-speed-computing part 80. The current-deviation-computing part 131, the $V_{a\_square}$-computing part 132, the threshold-value-computing part 133, and the offset-determining part 134 have the same or a similar configuration as in the first embodiment.

The map-reference-rotational-speed-computing part 80 uses the angular frequency ($\omega$) as input, offsets the angular frequency ($\omega$) in stages on the basis of the on and off [states] of the offset flag output from the offset-determining part 134, and outputs the reference angular frequency ($\omega^*$). The map-reference-rotational-speed-computing part 80 includes a rotational-speed-limiting part 81, an adder 82, a previous-value-maintaining part 83, a subtraction processing part 84, a offset-lower-limit-value-setting part 85, an adder 86, an offset-value-setting part 87, a switch 88, a rotational-speed-limiting part 89, and a rotational-direction-determining part 90, as shown in FIG. 10.

The rotational-speed-limiting part 81 sets an upper-limit angular frequency ($\omega_h$) with respect to the angular frequency ($\omega$) that is detected. The upper-limit angular frequency ($\omega_h$) corresponds to the highest reference angular frequency ($\omega^*$) among the maps stored in the current-voltage map 1. When an angular frequency that is higher than the upper-limit angular frequency ($\omega_h$) is input to the current-voltage map 1, the current-voltage map 1 cannot make reference to an appropriate map with respect to the input angular frequency. The rotational-speed-limiting part 81 is therefore used to provide an upper limit to the angular frequency ($\omega$), whereby an upper limit can also be provided to the reference angular frequency ($\omega^*$) input to the current-voltage map 1. When the angular frequency ($\omega$) is higher than the upper-limit angular frequency ($\omega_h$), the rotational-speed-limiting part 81 outputs the upper-limit angular frequency ($\omega_h$) to the adder 82 as an output angular frequency ($\omega_{lim}$). On the other hand, when the angular frequency ($\omega$) is less than or equal to the upper-limit angular frequency ($\omega_h$), the rotational-speed-limiting part 81 does not apply a limit to the angular frequency, and the angular frequency ($\omega$) is output to the adder 82 as the output angular frequency ($\omega_{lim}$).

The previous-value-maintaining part 83 saves a previous offset value ($\Delta\omega_s$) set by the control loop for setting the offset value, as shown below. The initial value of the previous offset value ($\Delta\omega_s$) is zero. The subtraction processing part 84 subtracts an offset subtraction value ($\omega_m$) from the previous offset value ($\Delta\omega_s$), whereby the previous offset value ($\Delta\omega_s$) is subtractively processed towards 0. The offset subtraction value ($\omega_m$) is the amount of change in the angular frequency for each unit of time and is set in advance. The offset subtraction value is set to a smaller value than an offset value ($\omega_{offset}$) described below. The subtraction process returns the angular frequency offset by the offset value ($\Delta\omega_s$) to an angular frequency that is not offset. The offset subtraction value ($\omega_m$) is fixed at a predetermined value in the subtraction processing part 84, and therefore limits are placed on the amount of change in the offset during the subtraction process. The subtraction processing part 84 subtracts the offset subtraction value ($\omega_m$) from the offset value ($\Delta\omega_s$), whereby an offset value ($\Delta\omega_{dec}$) is calculated and output to the offset-lower-limit-value-setting part 85.

A lower-limit value is set for the offset value ($\Delta\omega_{dec}$) is set in the offset-lower-limit-value-setting part 85. The offset-lower-limit-value-setting part 85 places a limit on the offset value ($\Delta\omega_{dec}$) and outputs an offset value ($\omega_{dec\_lim}$) to the adder 86. In cases where the subtraction process results in a negative offset value ($\Delta\omega_{dec}$), when the negative offset value ($\Delta\omega_{dec}$) is added in the adder 82, an offset is induced in the opposite direction from an angular frequency ($\omega$) which thus cannot converge to the original angular frequency ($\omega$). When the offset value ($\Delta\omega_{dec}$) is negative, the offset-lower-limit-value-setting part 85 therefore uses the previously subtractively processed offset value ($\Delta\omega_s$) as the offset value ($\Delta\omega_{dec\_lim}$) instead of the subtractively processed offset value ($\Delta\omega_{dec}$) and outputs this value to the adder 86. On the other hand, when the offset value ($\Delta\omega_{dec}$) greater than or equal to zero, the offset-lower-limit-value-setting part 85 outputs the subtractively processed offset value ($\Delta\omega_{dec}$) as the offset value ($\Delta\omega_{dec\_lim}$).

The offset value ($\omega_{offset}$) is set in advance in the offset-value-setting part 87. The offset value ($\omega_{offset}$) represents the magnitude of the offset value that is offset by the control shown in the control loop shown in FIG. 10 that is performed each time in the map-reference-rotational-speed-computing part 80. Setting the offset value ($\omega_{offset}$) to a large value allows the offset value of the detected voltage ($\omega_{dc}$) for each unit time to be increased.

The switch 88 controls the on and off states of the output line from the offset-value-setting part 87 to the adder 86. When the offset flag from the offset-determining part 134 is on, the switch 88 is turned on, and the offset value ($\omega_{offset}$) is input from the offset-value-setting part 87 to the adder 86. On the other hand, when the offset flag from the offset-determining part 134 is off, the switch 88 is off, and the offset value ($\omega_{offset}$) is not input from the offset-value-setting part 87 to the adder 86. In other words, when the switch 88 is on, offset processing is performed in the control loop on the basis of the offset value ($\omega_{offset}$), and when the switch 88 is off, offset processing is not performed in the control loop on the basis of the offset value ($\omega_{offset}$).

The adder 86 adds the output of the offset-lower-limit-value-setting part 85 and the output of the switch 88, and outputs an offset value ($\Delta\omega$) to the rotational-direction-determining part 90 and the previous-value-maintaining part 83. In other words, when the switch 88 is on, the offset value ($\Delta\omega$) is the offset value ($\omega_{offset}$) added to the offset value ($\Delta\omega_{dec\_lim}$). On the other hand, when the switch 88 is off, the offset value ($\Delta\omega$) is the offset value ($\Delta\omega_{dec\_lim}$). When the offset value ($\Delta\omega$) is input to the previous-value-maintaining part 83, the value is saved as the previous offset value ($\Delta\omega_s$).

The rotational-direction-determining part 90 determines the rotational direction of the motor 8 on the basis of the angular frequency ($\omega$). When $\omega<0$, the rotational-direction-determining part 90 computes that $\Delta\omega_{pn}=\Delta\omega\times(-1)$ and outputs the offset value ($\Delta\omega_{pn}$) to the adder 82. When $\omega\geq0$, the rotational-direction-determining part 90 defines $\Delta\omega_{pn}=\Delta\omega$ and outputs the offset value ($\Delta\omega_{pn}$) to the adder 82.

The subtractor 82 subtracts the offset value ($\Delta\omega_{pn}$) from the angular frequency ($\omega_{lim}$) of the voltage-limiting part 81, and outputs an angular frequency ($\omega_t$) to the rotational-speed-limiting part 89 for setting offset lower-limit values. The angular frequency ($\omega$) is thereby offset.

The rotational-speed-limiting part 89 sets an upper-limit angular frequency ($\omega_{t\_h}$) in relation to the absolute value of the offset angular frequency ($\omega_t$). The upper-limit angular frequency ($\omega_{t\_h}$) corresponds to the reference angular frequency ($\omega^*$) having the highest absolute value among the maps stored in the current-voltage map 1. When the absolute value of the angular frequency ($\omega_t$) is higher than the upper-limit angular frequency ($\omega_{t\_h}$), the rotational-speed-limiting part 89 adds the rotational direction to the upper-limit angular frequency ($\omega_{t\_h}$) and outputs the value as the reference angular frequency ($\omega^*$). On the other hand, when the absolute value of the angular frequency ($\omega_t$) is less than or equal to the upper-limit angular frequency ($\omega_{t\_h}$), the rotational-speed-limiting part 89 adds the rotational direction to the angular frequency ($\omega_t$) and output the value as the reference angular frequency ($\omega^*$).

The reference angular frequency ($\omega^*$) that is the output of the rotational-speed-limiting part 89 is input to the current-voltage map 1. The current-voltage map 1 uses the reference angular frequency ($\omega^*$) as input and calculates the dq-axis current command values ($i^*_d$, $i^*_q$) and the dq-axis decoupled voltage command values ($V^*_{d\_dcpl}$, $V^*_{Q\_dcpl}$), as described above.

Figure 11:
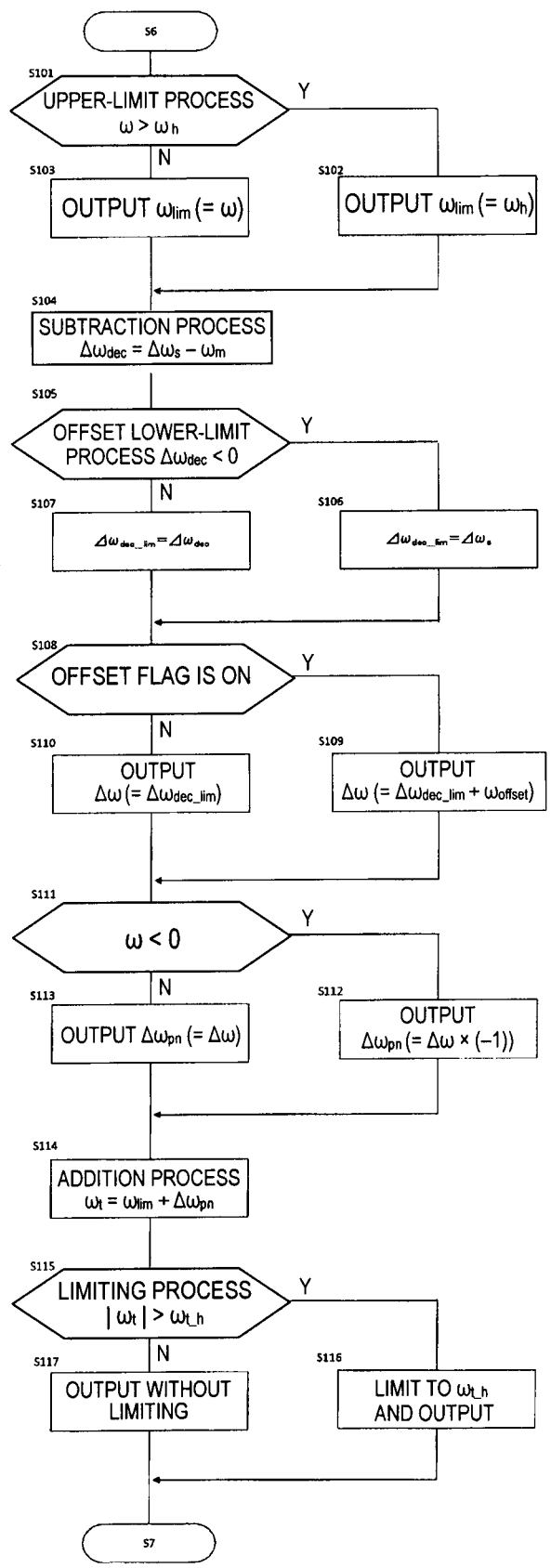
FIG. 11 is a flowchart that shows an example of operations performed by the motor controlling apparatus shown in FIG. 7.

Among the control processes of the motor controlling apparatus of the illustrated embodiment, the process for determining the control state of the inverter 6, the process for offsetting the angular frequency on the basis of the results of the determination process, and the process for computing the dq-axis current command values ($i^*_d$, $i^*_q$) using the maps will now be described with regard to FIG. 11. FIG. 11 is a flowchart that shows an example of operations of the offsetting process performed by the motor controlling apparatus of the illustrated embodiment. The process for determining the control state of the inverter 6 is the same or similar to that in the first embodiment, and descriptions thereof will therefore be omitted. In the process for computing the dq-axis current command values ($i^*_d$, $i^*_q$), the reference voltage ($V^*_{dc}$) and the angular frequency ($\omega$) in the computing process of the first embodiment can be replaced with the reference angular frequency ($\omega^*$) and the voltage ($V_{dc}$), and detailed descriptions thereof are therefore omitted.

As shown in FIG. 11, in step S101, the angular-frequency-limiting part 81 compares the angular frequency ($\omega$) and the upper-limit angular frequency ($\omega_h$) in order to place a limit on the upper value of the angular frequency ($\omega$). When the angular frequency ($\omega$) is higher than the upper-limit angular frequency ($\omega_h$), the angular-frequency-limiting part 81 limits the angular frequency ($\omega$) to the upper-limit angular frequency ($\omega_h$) and outputs the upper-limit angular frequency ($\omega_h$) as the output angular frequency ($\omega_{lim}$) in step S102. On the other hand, when the angular frequency ($\omega$) is equal to or less than the upper-limit angular frequency ($\omega_h$), the angular-frequency-limiting part 81 does not place limits on the angular frequency ($\omega$), and outputs the angular frequency ($\omega$) as the output angular frequency ($\omega_{lim}$) in step S103.

In step S104, the subtraction processing part 84 subtracts the offset subtraction value ($\omega_m$) from the offset value ($\Delta\omega_s$) saved in the previous-value-maintaining part 83, whereby the offset value ($\Delta\omega_{dec}$) is computed and output to the offset-lower-limit-value-setting part 85. In step S105, the offset-lower-limit-value-setting part 85 determines whether or not the offset value ($\Delta\omega_{dec}$) is less than 0 in order to place limits on the lower-limit value of the offset value ($\Delta\omega_{dec}$). When the offset value ($\Delta\omega_{dec}$) is less than 0, the offset-lower-limit-value-setting part 85 outputs the offset value ($\Delta\omega_s$) as the offset value ($\omega_{dec\_lim}$) (step S106). On the other hand, when the offset value ($\omega_{dec}$) is ihigher than 0, the offset-lower-limit-value-setting part 85 outputs the offset value ($\Delta\omega_{dec}$) as the offset value ($\omega_{dec\_lim}$) (step S107).

In step S108, the switch 88 turns the switch on when the offset flag has been set to "on" in step S5. In step S109, the adder 86 adds the offset value ($\omega_{offset}$) to the offset value ($\Delta\omega_{dec\_lim}$) and outputs the offset value ($\Delta\omega$). On the other hand, when the offset flag has been set to "off" in step S6, the switch 88 turns the switch off, the adder 86 does not perform addition processing on the basis of the offset value ($\omega_{offset}$), and the offset value ($\Delta\omega_{dec\_lim}$) is output as the offset value ($\Delta\omega$) in step S110.

In step S111, the rotational-direction-determining part determines the rotational direction of the motor 8 on the basis of the angular frequency ($\omega$). When $\omega<0$, the rotational-direction-determining part 90 computes that $\Delta\omega_{pn}=\Delta\omega\times(-1)$ and outputs the offset value ($\Delta\omega_{pn}$) to the adder 82 (step S112). On the other hand, when $\omega\geq0$, the rotational-direction-determining part 90 defines $\Delta\omega=\Delta\omega$ and outputs the offset value ($\Delta\omega_{pn}$) to the adder 82 in step S113.

In step 114, the adder 82 adds the offset value ($\Delta\omega_{pn}$) to the output angular frequency ($\omega_{lim}$) of the angular-frequency-limiting part 81, whereby the angular frequency ($\omega_t$) is computed and output to the angular-frequency-limiting part 89. In step S115, the angular-frequency-limiting part 89 compares the absolute value of the angular frequency ($\omega_t$) and the upper-limit angular frequency ($\omega_{t\_h}$) in order to place a limit on the upper value of the angular frequency ($\omega_t$). When the absolute value of the angular frequency ($\omega_t$) is higher than the upper-limit angular frequency ($\omega_{t\_h}$), the angular-frequency-limiting part 89 limits the absolute value of the angular frequency ($\omega_t$) to the upper-limit angular frequency ($\omega_{t\_h}$), and outputs the upper-limit angular frequency ($\omega_{t\_h}$) as the reference angular frequency ($\omega^*$) in step S116. On the other hand, when the absolute value of the angular frequency ($\omega_t$) is less than or equal to the upper-limit angular frequency ($\omega_{t\_h}$), the angular-frequency-limiting part 89 does not place limits on the upper-limit angular frequency ($\omega_{t\_h}$), and the angular frequency ($\omega_t$) is output as the reference angular frequency ($\omega^*$) in step S117. The map switcher 13 outputs the reference angular frequency ($\omega^*$) to the current-voltage map 1, whereby the process of step S7 shown by steps S101 through S117 ends, and the operations proceed to step S8.

As described above, in the illustrated embodiment, the map switcher 13 offsets the angular frequency ($\omega$) using the offset value ($\Delta\omega$) according to the control state of the inverter 6, and the current-voltage map 1 uses the offset angular frequency ($\omega^*$) as input, calculates the dq-axis current command values ($i^*_d$, $i^*_q$) and the dq-axis decoupled voltage command values ($V^*_{d\_dcpl}$, $V^*_{q\_dcpl}$), and increases the d-axis current command value ($i^*_d$) on the negative side. Increasing the d-axis current command value ($i^*_d$) on the negative side thereby enhances a field-weakening effect, restricts the voltage applied to the motor 8, and allows the inverter 6 to be stably controlled.

The angular frequency ($\omega$) that serves as the index for the map is offset in the illustrated embodiment, and therefore the data for the current command value for optimizing the efficiency of the inverter 6 is allocated to the map corresponding to the angular frequency ($\omega^*$) after offsetting. The current command value extracted from this map is a value that will not cause a large decline in the efficiency of the inverter 6. In the illustrated embodiment, the d-axis current command value is thereby increased on the negative side, and the efficiency of the inverter 6 can be prevented from greatly declining, while the control state of the inverter 6 is stabilized.

In addition, the q-axis current command value is also calculated with reference to the map corresponding to the offset angular frequency ($\omega^*$) at the same time as the d-axis current command value is being increased. Therefore the actual torque can be prevented from diverging from the torque command value ($T^*$).

Also, the maps stored in the current-voltage map 1 are formed so that under a condition in which the torque command value ($T^*$) and the detected voltage ($V_{dc}$) are the same, the d-axis current command value ($i^*_d$) corresponding to the offset angular frequency ($\omega^*$) is greater on the negative side than the d-axis current command value ($i^*_d$) corresponding to the angular frequency ($\omega$) that has not been offset. Offsetting the angular frequency ($\omega$) thereby causes the d-axis current command value ($i^*_d$) to increase on the negative side. Therefore the inverter 6 is controlled on the basis of the optimal d-axis current command value ($i^*_d$), the efficiency of the inverter 6 does not greatly decline, and a state of insufficient voltage can be eliminated.

Furthermore, the map switcher 13 offsets the angular frequency ($\omega$) in stages until the control state of the inverter 6 stabilizes. The angular frequency ($\omega$) is thereby gradually offset, and the d-axis current command value ($i^*_d$) is gradually increased; therefore the d-axis current command value ($i^*_d$) can be increased by the increments necessary for stabilizing the control state of the inverter 6. As a result, the efficiency of the inverter 6 can be prevented from greatly declining.

When the control state of the inverter 6 has moved from an unstable state to a stable state, the offset angular frequency ($\omega^*$) is returned to the angular frequency ($\omega$) by amounts of change that are less than the offset value ($\omega_{offset}$) Offsetting can thereby occur quickly when necessary, and unstable operational points can be avoided early, whereby voltage insufficiency, current deviations, and the like are avoided, and control of the inverter 6 can be stabilized. On the other hand, when the offset state is returned to the original state, returning to the original state gradually will make it possible to prevent overshooting of the modulation factor, offset hunting and destabilization, and other phenomena.

The offset value ($\omega_{offset}$) may be set to a level such that merely offsetting the angular frequency ($\omega$) causes the d-axis current command value ($i^*_d$) to increase. The offset value ($\omega_{offset}$) may be set so that the angular frequency ($\omega^*$) that is offset on the basis of the offset value ($\omega_{offset}$) falls within a range of voltages allocated to the maps.

The offset value ($\omega_{offset}$), the offset value ($\Delta\omega$), or the offset value ($\Delta\omega_{pn}$) referred to in this illustrated embodiment can be considered to correspond to the "predetermined offset amount," and the angular frequency ($\omega$) or the angular frequency ($\omega^*$) can be considered to correspond to the "detected angular frequency."

Accordingly, as can be appreciated from the above, a detected voltage of a direct-current power source or a detected rotational speed of a motor is offset by a predetermined offset amount according to a control state of an inverter. A current command value for an alternating current of the inverter is then calculated using the offset detected voltage or detected rotational speed as input. Then, a d-axis current command value included in the current command value is increased on the negative side. Accordingly, an appropriate detected voltage or detected rotational speed is offset, a current command value is calculated, and a d-axis current command value is prevented from being larger than necessary so that the efficiency of the inverter does not greatly decline. Therefore, the inverter can be stably controlled.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The terms "detect" or "sense" and their variations as used herein to describe an operation or function carried out by a component, a section, a device or the like includes a component, a section, a device or the like that does not require physical detection or sensing, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A motor controlling apparatus comprising:
   an inverter configured to convert direct-current power to alternating-current power and supply the power to a motor, the direct-current power being input from a direct-current power source;
   a voltage detector configured to detect a direct-current voltage of the direct-current power source;
   a rotational speed detector configured to detect a rotational speed of the motor;
   a command value calculating component configured to calculate a current command value for an alternating current output by the inverter based on a detected voltage detected by the voltage detector, a torque command value input from an external source, and a detected rotational speed detected by the rotational speed detector;
   an inverter controller configured to provide a control signal for a switching element included in the inverter and to control the inverter based on the current command value;
   a state detector configured to detect a control state of the inverter; and
   an offsetting component configured to offset the detected voltage or the detected rotational speed by an offset amount according to the control state detected by the state detector;
   the command value calculating component being further configured to modify the current command value based on the detected voltage or the detected rotational speed that was offset by the offsetting component when the control state of the inverter is detected to be unstable by the state detector such that a d-axis current command value included in the current command value becomes more negative as compared to a d-axis current command value derived from the detected voltage before the current command value was modified.

2. The motor controlling apparatus according to claim 1, wherein
   the command value calculating component is configured to store a map that relates a correspondence between the detected voltage, the torque command value, the detected rotational speed, the d-axis current command value, and the q-axis current command value; and
   where the torque command value and the detected rotational speed are equal in the map, the d-axis current command value corresponding to a second detected voltage offset from a first detected voltage is greater on the negative side than the d-axis current command value corresponding to the first detected voltage.

3. The motor controlling apparatus according to claim 2, wherein
   the offsetting component is configured to offset the detected voltage or the detected rotational speed in stages until the control state detected by the state detector is a stable state.

4. The motor controlling apparatus according to claim 2, wherein
   the state detector is configured to compute a modulation factor for the inverter and determine that the control state of the inverter is unstable when the modulation factor is greater than a predetermined modulation factor.

5. The motor controlling apparatus according to claim 2, further comprising
   a current detector configured to detect a current flowing from the inverter to the motor; and
   wherein
   the state detector is configured to determine a difference in current between the current command value calculated by the command value calculating component and a detected current detected by the current detector, and to determine that the control state of the inverter is unstable when the difference in current exceeds a predetermined current threshold.

6. The motor controlling apparatus according to claim 2, wherein
   when the control state detected by the state detector changes from unstable to stable, the offsetting component is configured to return the offset detected voltage to the detected voltage detected by the voltage detector or to return the offset detected rotational speed to the detected rotational speed, by amounts of change smaller than the offset amount.

7. The motor controlling apparatus according to claim 1, wherein
   the command value calculating component is configured to store a map that relates a correspondence between the detected voltage, the torque command value, the detected rotational speed, the d-axis current command value, and the q-axis current command value; and
   where the torque command value and the detected voltage are equal in the map, the d-axis current command value corresponding to a second detected rotational speed offset from a first detected rotational speed is greater on the negative side than the d-axis current command value corresponding to the first detected rotational speed.

8. The motor controlling apparatus according to claim 7, wherein
   the offsetting component is configured to offset the detected voltage or the detected rotational speed in stages until the control state detected by the state detector is a stable state.

9. The motor controlling apparatus according to claim 7, wherein
   the state detector is configured to compute a modulation factor for the inverter and determine that the control state of the inverter is unstable when the modulation factor is greater than a predetermined modulation factor.

10. The motor controlling apparatus according to claim 7, further comprising
    a current detector configured to detect a current flowing from the inverter to the motor; and
    wherein
    the state detector is configured to determine a difference in current between the current command value calculated by the command value calculating component and a detected current detected by the current detector, and to determine that the control state of the inverter is unstable when the difference in current exceeds a predetermined current threshold.

11. The motor controlling apparatus according to claim 7, wherein
    when the control state detected by the state detector changes from unstable to stable, the offsetting component is configured to return the offset detected voltage to the detected voltage detected by the voltage detector or to return the offset detected rotational speed to the detected rotational speed, by amounts of change smaller than the offset amount.

12. The motor controlling apparatus according to claim 1, wherein
the offsetting component is configured to offset the detected voltage or the detected rotational speed in stages until the control state detected by the state detector is a stable state.

13. The motor controlling apparatus according to claim 12, wherein
the state detector is configured to compute a modulation factor for the inverter and determine that the control state of the inverter is unstable when the modulation factor is greater than a predetermined modulation factor.

14. The motor controlling apparatus according to claim 12, further comprising
a current detector configured to detect a current flowing from the inverter to the motor; and
wherein
the state detector is configured to determine a difference in current between the current command value calculated by the command value calculating component and a detected current detected by the current detector, and to determine that the control state of the inverter is unstable when the difference in current exceeds a predetermined current threshold.

15. The motor controlling apparatus according to claim 12, wherein
when the control state detected by the state detector changes from unstable to stable, the offsetting component is configured to return the offset detected voltage to the detected voltage detected by the voltage detector or to return the offset detected rotational speed to the detected rotational speed, by amounts of change smaller than the offset amount.

16. The motor controlling apparatus according to claim 1, wherein
the state detector is configured to compute a modulation factor for the inverter and determine that the control state of the inverter is unstable when the modulation factor is greater than a predetermined modulation factor.

17. The motor controlling apparatus according to claim 16, wherein
when the control state detected by the state detector changes from unstable to stable, the offsetting component is configured to return the offset detected voltage to the detected voltage detected by the voltage detector or to return the offset detected rotational speed to the detected rotational speed, by amounts of change smaller than the offset amount.

18. The motor controlling apparatus according to claim 1, further comprising
a current detector configured to detect a current flowing from the inverter to the motor; and
wherein
the state detector is configured to determine a difference in current between the current command value calculated by the command value calculating component and a detected current detected by the current detector, and to determine that the control state of the inverter is unstable when the difference in current exceeds a predetermined current threshold.

19. The motor controlling apparatus according to claim 1, wherein
when the control state detected by the state detector changes from unstable to stable, the offsetting component is configured to return the offset detected voltage to the detected voltage detected by the voltage detector or to return the offset detected rotational speed to the detected rotational speed, by amounts of change smaller than the offset amount.

20. A method for controlling a motor comprising:
operating an inverter to convert direct-current power provided by a direct-current power source to alternating-current power and to supply the alternating-current power to a motor;
detecting a direct-current voltage of the direct-current power source;
detecting a rotational speed of the motor;
calculating a current command value of an alternating current being output from the inverter based on the detected direct-current voltage, a torque command value input from an external source, and the detected rotational speed;
generating a control signal for a switching element included in the inverter and controlling the inverter based on the current command value;
detecting a control state of the inverter;
offsetting the detected direct-current voltage or the detected rotational speed by a predetermined offset amount according to the detected control state; and
modifying the current command value based on the offset detected voltage or the offset detected rotational speed when the control state of the inverter is detected to be unstable to make a d-axis current command value included in the current command value more negative as compared to a d-axis current command value derived from the detected voltage before the modifying of the current command value.

* * * * *